(12) United States Patent
Wirasinghe

(10) Patent No.: US 10,652,620 B2
(45) Date of Patent: May 12, 2020

(54) MOVIE TRAILER VOTING SYSTEM WITH AUDIO MOVIE TRAILER IDENTIFICATION

(71) Applicant: TrailerVote Corp., Sunnyvale, CA (US)

(72) Inventor: Marco Wirasinghe, Sunnyvale, CA (US)

(73) Assignee: TrailerVote Corp., Sunnyvale, CA (US)

( * ) Notice: Subject to any disclaimer, the term of this patent is extended or adjusted under 35 U.S.C. 154(b) by 0 days.

(21) Appl. No.: 15/832,439

(22) Filed: Dec. 5, 2017

(65) Prior Publication Data

US 2019/0174193 A1    Jun. 6, 2019

(51) Int. Cl.
*H04N 21/475* (2011.01)
*G06Q 30/02* (2012.01)
*H04N 21/45* (2011.01)
*G06Q 50/00* (2012.01)
*G06F 16/683* (2019.01)

(52) U.S. Cl.
CPC ....... *H04N 21/4758* (2013.01); *G06F 16/683* (2019.01); *G06Q 30/0251* (2013.01); *G06Q 50/01* (2013.01); *H04N 21/4524* (2013.01); *H04N 21/4751* (2013.01); *G09G 2320/0233* (2013.01)

(58) Field of Classification Search
CPC ........... H04N 21/4722; H04N 21/4312; H04N 21/25866; H04N 21/2668; H04N 21/4524; G06F 16/683; G06Q 50/01; G06Q 30/0251; G09G 2320/0233

USPC .............................. 725/24, 28, 37, 109, 116
See application file for complete search history.

(56) References Cited

U.S. PATENT DOCUMENTS

| | | | |
|---|---|---|---|
| 8,463,773 B2* | 6/2013 | Moshrefi ........... | G06F 17/30817 707/708 |
| 9,202,233 B1* | 12/2015 | Siegel ................ | G06Q 30/0252 |
| 2004/0258046 A1 | 12/2004 | Wu et al. | |
| 2005/0081241 A1* | 4/2005 | Chen ...................... | H04H 60/46 725/41 |
| 2006/0085419 A1 | 4/2006 | Rosen | |
| 2008/0215760 A1* | 9/2008 | Song ....................... | H04W 4/02 709/248 |
| 2011/0087523 A1 | 4/2011 | Earl | |
| 2011/0247044 A1 | 10/2011 | Jacoby | |
| 2011/0276680 A1 | 11/2011 | Rimon | |
| 2011/0307786 A1 | 12/2011 | Shuster | |
| 2012/0214544 A1 | 8/2012 | Shivappa et al. | |
| 2013/0132382 A1 | 5/2013 | Kuznetsov et al. | |

(Continued)

OTHER PUBLICATIONS

US Patent and Trademark Office, Non-Final Office Action for U.S. Appl. No. 15/832,523 dated Mar. 7, 2018.

(Continued)

*Primary Examiner* — Anthony Bantamoi
(74) *Attorney, Agent, or Firm* — Lowenstein Sandler LLP

(57) ABSTRACT

A computing device receives audio data and identifies a movie trailer from the audio data. The computing device generates a prompt for user feedback regarding a movie associated with the movie trailer. The computing device receives user feedback from a user regarding the movie associated with the movie trailer. The computing device determines a likelihood that the user will attend a showing of the movie at a theater based on the user feedback.

18 Claims, 18 Drawing Sheets

(56) References Cited

U.S. PATENT DOCUMENTS

| | | | |
|---|---|---|---|
| 2014/0195428 A1* | 7/2014 | Ghetler | G06Q 20/40 |
| | | | 705/44 |
| 2014/0278969 A1* | 9/2014 | Newell | G06Q 30/0276 |
| | | | 705/14.53 |
| 2015/0039320 A1 | 2/2015 | Neuhauser et al. | |
| 2015/0046828 A1* | 2/2015 | Desai | G06F 1/163 |
| | | | 715/739 |
| 2015/0186509 A1* | 7/2015 | Kelly | G06F 1/3287 |
| | | | 707/748 |
| 2015/0220967 A1 | 8/2015 | Ikai et al. | |
| 2015/0269945 A1* | 9/2015 | Taylor | G06Q 30/0601 |
| 2015/0294374 A1* | 10/2015 | Mlodzinski | H04N 21/23424 |
| 2016/0094598 A1* | 3/2016 | Gedikian | H04L 65/60 |
| 2016/0148122 A1* | 5/2016 | Paleja | G06Q 10/02 |
| 2016/0148126 A1 | 5/2016 | Paleja et al. | |
| 2016/0316262 A1* | 10/2016 | Chen | H04N 21/44008 |
| 2017/0124818 A1 | 5/2017 | Ullrich et al. | |
| 2017/0193846 A1 | 7/2017 | Breaux | |
| 2017/0195717 A1 | 7/2017 | Wang et al. | |
| 2018/0124472 A1 | 5/2018 | Staff et al. | |
| 2018/0279201 A1 | 9/2018 | Pandya | |

OTHER PUBLICATIONS

US Patent and Trademark Office, Final Office Action for U.S. Appl. No. 15/832,523 dated Jul. 13, 2018.

International Search Report and Written Opinion for International Application No. PCT/US18/31066 dated Jun. 11, 2018. 16 pages.

Extended European Search Report for European Patent Application No. 18183877.2 dated Jan. 8, 2019, 9 pages.

Cunningham, S. et al. "Second screen comes to the silver screen: A technology feasibility study regarding mobile technologies in the cinema", 2015 Internet Technologies and Applications (ITA), IEEE, Sep. 8, 2015, pp. 228-232; retrieved on Nov. 2, 2015.

"Ebay Feedback-WTF? Can't Leave Neutral or Negative Feedback for 7 Days?" Forum, Lotus Seven Club, May 23, 2014, 7 pages.

International Search Report and Written Opinion for International Application No. PCT/US18/63914 dated Feb. 19, 2019, 11 pages.

Dooms et al. "A framework for Dataset Benchmarking and its Application to a New Movie Rating Dataset" in ACM Transactions on Intelligent Systems and Technology (TIST), Apr. 2016, 31 pages, downloaded from https://repositorio.uam.es/bitstream/handle/10486/674368/framework_dooms_ATIST_2016_ps.pdf?sequence=1.

US Patent and Trademark Office, Non-Final Office Action for U.S. Appl. No. 16/009,165 dated Aug. 23, 2019.

* cited by examiner

MOVIE TRAILER VOTING SYSTEM WITH AUDIO MOVIE TRAILER IDENTIFICATION

RELATED APPLICATIONS

This application is related to co-pending U.S. patent application Ser. No. 15/832,494 entitled "AUTOMATED EVENT PLANNING SYSTEM" which was filed with the USPTO on Dec. 5,2017 and U.S. patent application Ser. No. 15/832,523 entitled "MOVIE TRAILER VOTING SYSTEM" which was filed with the USPTO on Dec. 5,2017.

TECHNICAL FIELD

This disclosure relates to the field of movies and in particular to a movie trailer voting system.

BACKGROUND

Movie theater chains such as AMC® Theaters, Regal Entertainment Group® and Cinemark® Theaters provide movie applications that users can install on their mobile phones and tablet computing devices. These movie applications enable users subscribe to theater memberships, browse movies that are playing or are coming soon, determine movie showtimes, and purchase tickets for movies.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
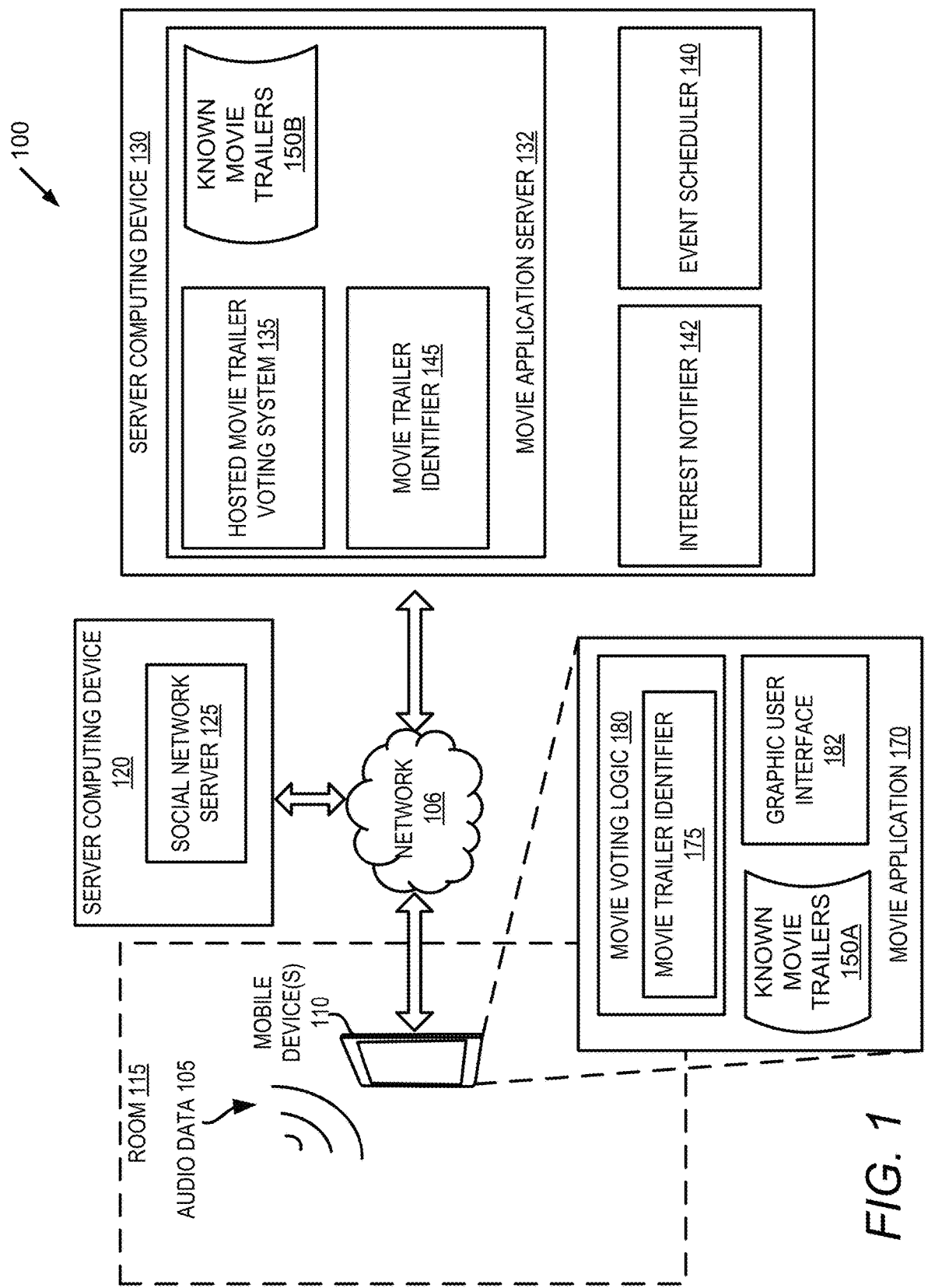
FIG. 1 is a block diagram illustrating a network environment in which embodiments of the present invention may operate.

Some embodiments described herein relate to a movie trailer voting system. Other embodiments relate to an event attendance scheduling system. These systems may be used together or separately to help users determine movies to see, to help movie theaters determine what movies to show, to help movie studios determine demand for their movies and adjust their marketing plans, and to help users identify other users with whom they could attend movies. Additionally, the event attendance scheduling system may be used to schedule joint attendance of events other than movies, such as sporting events, comedy shows, plays, musicals, concerts, and so on.

At any given movie showing, there are generally 10-20 minutes of movie trailers that precede the feature presentation. Movie trailers are generally about 2.5 minutes long, so there are generally about 4-10 movie trailers that are shown prior to the feature presentation. On average, people attend around 5.6 movie showings at theaters a year. Accordingly, viewers are exposed to around 20-60 movie trailers each year just from previews shown at theaters.

Viewers of movie trailers generally have a positive reaction, a neutral reaction, or a negative reaction about the movie associated with the movie trailers. However, presently there is no mechanism for capturing viewer reactions of the mainstream public (also referred to herein as user sentiment or user feedback). Accordingly, viewers of movie trailers often forget about movies that they were interested in seeing on the viewing of a movie trailer as well as about movies that they were not interested in seeing on the viewing of a movie trailer. Moreover, a movie theater has inadequate information as to which movies will be in demand and which movies will not be in demand. This leads to inefficient allocation of theater resources. For example, theaters have to guess about how many screens to allocate for particular movies and how many daily showings to allocate for particular movies. Furthermore, movie studios don't generally know the demand for their movies, and don't know which particular individuals have interest in seeing their movies.

Embodiments are described for a movie trailer voting system that enables users to vote on or rate movie trailers that they watch as those movie trailers are watched. Embodiments capture the sentiment of users towards movies from movie trailers of those movies. Such sentiments are then stored, and may be used for multiple purposes. The user sentiment toward the movies may be used to notify users interested in a movie when that movie is in theaters, to notify users of special promotions or exhibitions, and/or to notify users when that movie will stop playing in theaters. The user sentiment may also be used to find friends, family, coworkers, group members, and acquaintances who are interested in seeing the same movie and arranging or scheduling joint attendance of a movie theater showing for those friends, family and/or acquaintances. Additionally, the user sentiment may be captured for many users, and may be reported to movie studios and/or movie theaters to indicate demand for particular movies.

In one embodiment, a mobile device executing a movie application activates a microphone and receives audio data via the microphone. The mobile device identifies a movie trailer from the audio data and generates a prompt for user feedback regarding a movie associated with the movie trailer. The mobile device receives user feedback from a user regarding the movie associated with the movie trailer. The mobile device or a server computing system may then determine a likelihood that the user will attend a showing of the movie at a theater based on the user feedback. For example, the prompt may ask "are you interested in seeing this movie?" The user may swipe left to indicate no, and may swipe right to indicate yes. Accordingly, the likelihood that the user will attend the showing may be determined from the user feedback. The user feedback may be stored on the mobile device and/or may be sent to a server computing device.

In one embodiment, a system includes a digital projector and a computing device connected to the digital projector by a network. The digital projector may send a first message to the computing device when it is ready to begin projecting content associated with a feature movie (also referred to herein as a feature presentation), wherein the first message comprises an indication that the digital projector is to begin projecting content associated with the feature movie in a room of a theater. The digital projector may then project a sequence of movie trailers prior to projection of the feature movie. Responsive to receipt of the first message from the digital projector, the computing device may determine the content associated with the feature movie, which may include determining the sequence of movie trailers. The computing device may identify a plurality of mobile devices located in the room of the theater and send identifiers of the movie trailers in the sequence of movie trailers to the plurality of mobile devices. The mobile phones may then prompt users to vote on the movie trailers presented in the sequence. Responsive to the voting, the computing device may receive, from one or more of the plurality of mobile devices, user feedback regarding the movies associated with the movie trailers.

In one embodiment, a computing device determines a first event attendance pattern for a first user account, wherein the first event attendance pattern comprises data on days that a first user associated with the first user account attends events and data on locations at which the first user attends events. The computing device further determines that the first user has an interest in attending an upcoming event. The computing device further determines a second event attendance pattern for a second user account, wherein the second event attendance pattern comprises data on days that a second user associated with the second user account attends events and data on locations at which the second user attends events. The computing device further determines that the second user has an interest in attending the upcoming event. The computing device further determines that the first user has a relationship with the second user.

Subsequent to making the aforementioned determinations, the computing device determines whether the first user and the second user have compatible event attendance patterns. Identifying compatible event attendance patterns may include determining a first overlap between the days that the first user attends events and the days that the second user attends events. Determining compatible event attendance patterns may further include determining a second overlap between the locations at which the first user attends events and the locations at which the second user attends events. The first user and the second user may have compatible event attendance patterns if the first overlap comprises at least one day and the second overlap comprises at least one location.

Responsive to determining that the first user and the second user have compatible event attendance patterns, the computing device sends a first message to the first user account, wherein the first message comprises an inquiry as to whether the first user has an interest in attending the upcoming event with the second user, and receives a first response from the first user account indicating that the first user has an interest in attending the upcoming event with the second user. Additionally, the computing device sends a second message to the second user account, wherein the second message comprises an inquiry as to whether the second user has an interest in attending the upcoming event with the first user, and receives a second response from the second user account indicating that the second user has an interest in attending the upcoming event with the first user. The computing device then schedules joint attendance to the upcoming event for the first user account and the second user account for a day that is within the first overlap and for a location that is within the second overlap.

FIG. 1 is a block diagram illustrating a network environment 100 in which embodiments of the present invention may operate. In one embodiment, network environment 100 includes one or more mobile devices 110, a server computing device 120, a server computing device 130, and network 106 over which the mobile devices 110 and/or server computing devices 120, 130 may communicate. The network 106 can include a local area network (LAN), a wireless network, a telephone network, a mobile communications network, a wide area network (WAN) (e.g., such as the Internet) and/or similar communication system. The network 106 can include any number of networking and computing devices such as wired and wireless devices.

The server computing device 120 and server computing device 130 may include a physical machine and/or a virtual machine hosted by a physical machine. The physical machine may be a rackmount server, a desktop computer, or other computing device. In one embodiment, the server computing devices 120, 130 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Mobile devices 110 are mobile computing devices such as an electronic book reader, portable digital assistant, mobile phone, laptop computer, portable media player, tablet computer, camera, video camera, netbook, notebook, and the like. Mobile devices 110 may include a memory, a processing device (e.g., one or more microprocessor), a display, a microphone, speakers, and so on.

Each mobile device 110 may include installed thereon a movie application 170. The movie application 170 may include a graphic user interface (GUI) 182, movie voting logic 180 and/or data for one or more known movie trailers 150A. The graphic user interface 182 may provide a menu of display options. A user may navigate the GUI by selecting (e.g., pressing buttons associated with) options to preview movies playing in theaters, view trailers, purchase movie tickets, and so on. A user may select to organize or filter movies by location, movie, genre, playtime, and so on. The movie application 170 on each mobile device 110 is associated with a particular user account of a movie application server 132. The movie application 170 may log into the movie application server 132 using credentials and/or identifiers generated for and/or associated with a particular user account.

In one embodiment, the movie application 170 includes a movie voting logic 180. The movie voting logic 180 enables users to vote on or rank movie trailers. The ranking or voting applied to a movie trailer for a user account indicates user sentiment about a movie represented in the movie trailer. The user sentiment may reflect that user's level of interest in seeing the movie. Alternatively, the user's level of interest in seeing the movie may be determined from a rating of the movie trailer and/or ratings of one or more other movie trailers for the same movie.

In one embodiment, movie voting logic 180 includes a movie trailer identifier 175. Movie trailer identifier 175 uses audio data to detect movie trailers being watched by a user of a mobile device 110. A user may select to enter a movie trailer voting mode by selecting a movie trailer voting option in the GUI 182. Responsive to selection of the movie trailer voting mode, GUI 182 may prompt the user for permission to enable and/or use a microphone of the mobile device 110.

Once the user provides permission to activate and/or use the microphone, movie trailer identifier 175 begins sampling audio. Mobile device 110 may be located in a room 115 in which a movie trailer is being played. In one embodiment, the room 115 is a room of a movie theater (e.g., a theater room). Alternatively, the room 115 may be a room in a house in which a movie and/or movie trailer is being played. For example, the room 115 may be a living room, an entertainment room, and so on. Mobile device 110 receives audio data 105, which includes the audio track of the movie trailer output by speakers in the room 115. The audio data 105 may additionally include other audio data, such as conversations of other movie goers, coughing, sneezing, and/or other background noises. Movie trailer identifier 175 then attempts to identify the movie trailer based on the received audio data 105.

In one embodiment, movie trailer identifier 175 sends the audio data 105 to movie application server 132 for identification. Captured audio data 105 may be captured by movie trailer identifier 175 and sent to movie application server 132 in the form of an audio recording or an audio stream. Captured audio data 105 may have a compressed or uncompressed audio format. Compressed audio formats may have lossy compression or lossless compression. Examples of audio formats that may be used include waveform audio file format (WAV), audio interchange file format (AIFF), free lossless audio codec (FLAC), Windows® media audio lossless (WMA lossless), Apple® lossless (ALAC), Opus, Moving Picture Experts Group audio layer III (MP3), Vorbis, advanced audio coding (AAC) and adaptive transform acoustic coding (ATRAC), to name a few.

In one embodiment movie trailer identifier 175 generates digital fingerprints of the audio data 105, and sends the digital fingerprints to movie application server 132. In one embodiment, the audio data 105 is divided into multiple portions, and a digital fingerprint is generated from each portion. For example, the audio data 105 may be divided into portions that are 1 second, 2 seconds, 3 seconds, 5 seconds, 6 seconds, 8 seconds, 10 seconds, 15 seconds, 20 seconds, and so on in length. A digital fingerprint may be generated for each portion of the audio data 105 or for a subset of the portions. Identification of the movie trailer may then be determined using the generated digital fingerprints for one or more of the portions of the audio data 105.

Movie trailer identifier 175 may generate digital fingerprint(s) using conventional techniques known in the art. For example, a digital fingerprint of a portion of audio data 105 may be a feature vector generated by extracting features from a portion of the audio data 105. Examples of acoustical features that may be extracted from audio data 105 and included in a digital fingerprint of a portion of the audio data may include loudness, pitch, bass, brightness, bandwidth, Mel-frequency cepstral coefficients (MFCCs), and so forth. A digital fingerprint may additionally or alternatively include first and/or second derivatives of some or all of these features. A digital fingerprint may additionally or alternatively include statistical measurements such as mean and standard deviations of first order features.

In one embodiment, movie trailer identifier 175 generates a stream of digital fingerprints, and sends the stream of digital fingerprints to movie application server 132.

In one embodiment, movie trailer identifier 175 generates digital fingerprints from the audio data 105 and then attempts to identify the movie trailer based on comparison of the digital fingerprint to digital fingerprints of known movie trailers 150A. Movie application 170 may store digital fingerprints of multiple known movie trailers that are being played in theaters. At any given time, there may be anywhere from about 10-100 movie trailers that are being shown in theaters. The known movie trailers 150A may be kept up to date so that mobile device 110 stores information about the known movie trailers 150A that are presently in theaters, but does not necessarily store information about known movie trailers that are no longer shown in theaters and/or known movie trailers that have not yet started showing in theaters. This may keep the amount of data associated with the known movie trailers 150A that is stored on mobile devices 110 to a minimum.

Movie trailer identifier 175 compares a generated digital fingerprint of audio data 105 to stored digital fingerprints of the known movie trailers 150A. In one embodiment, the generated digital fingerprint is compared to digital fingerprints of overlapping portions of known movie trailers. For example, the generated digital fingerprint may be compared to a first digital fingerprint of seconds 1-5 of a known movie trailer, to a second digital fingerprint of seconds 2-6 of the known movie trailer, to a third digital fingerprint of seconds 3-7 of the known movie trailer, and so on. For each comparison, a similarity score may be generated that indicates a similarity between the digital fingerprint and a digital fingerprint of a known movie trailer 150A. A similarity score that exceeds a similarity threshold indicates a match between the audio data 105 and a portion of a known movie trailer 150A.

Multiple digital fingerprints may be stored of each known movie trailer 150A, and the digital fingerprint of the audio data 105 may be compared to the digital fingerprints of some or all of the digital fingerprints for a given known movie trailer 150A. In one embodiment, comparisons between the generated digital fingerprint of the audio data 105 and the digital fingerprints of the known movie trailers 150A are made until a match is found between a generated digital fingerprint and a stored digital fingerprint of a portion of a known movie trailer 150A. Similarity values may be computed based on the comparison of the generated digital fingerprint to one or more digital fingerprints of known movie trailers. The similarity value may be based on a similarity of one or more features of the generated digital fingerprint to one or more features of a digital fingerprint of a known movie trailer. A match may be found when a similarity value between the generated digital fingerprint and a digital fingerprint of a known movie trailer satisfies a match criterion. In one embodiment, the match criterion is a similarity threshold. Accordingly, if a similarity value exceeds a similarity threshold, then a match may be determined.

Once a match is determined between the generated digital fingerprint of the audio data 105 and a stored digital fingerprint of a known movie trailer, then a movie trailer being played in the room 115 is identified. Additionally, each stored digital fingerprint may be associated with a start and end time index. The time indexes may be time offsets into the movie trailer. Accordingly, the matching digital fingerprint of the known movie trailer 150A may be used to identify the time offset into the detected movie trailer. The stored information about the known movie trailers 150A may include additional information such as screen shots, actor information, director information, producer information, studio information, genre, movie trailer length, and so on. Once the movie trailer is identified, GUI 182 may display information about the detected movie trailer, and may indicate a length of the movie trailer and a current time offset or index into the movie trailer that is being played in the room 115.

In one embodiment, the movie trailer identifier 175 generates digital fingerprints until a match is found between a digital fingerprint and a stored digital fingerprint of a known movie trailer 150A. In one embodiment, once a match is found, movie trailer identifier 175 may stop generating digital fingerprints. This may conserve battery life of the mobile device 110. In one embodiment, once a match is found, movie application 170 temporarily disables the microphone and/or stops receiving audio data captured by the microphone. The detected time offset into the movie trailer and the known length of the movie trailer may be used by movie trailer identifier 175 to predict a time at which the movie trailer will end. At or around the predicted tile at which the movie trailer will end, movie voting logic 180 may prompt a user of mobile device 110 to provide user feedback (e.g., user sentiment) about the movie trailer. Alternatively, the prompt to provide user feedback about the movie trailer may be output to a display of mobile device 110 upon identification of the movie trailer. In such an embodiment, a further prompt may be provided at around a time that the movie trailer ends to draw the user's attention to the previously output prompt for user feedback. The prompt and/or further prompt may be accompanied by or include a brightening of the mobile device's display, a vibration of the mobile device 110, a quiet audio alert, and so on.

The prompt for user feedback may include a request for a rating of the movie trailer. The rating may be, for example, on a rating system of 1-5 or 1-10 stars, where a lower number of stars indicates a lower interest level in the movie associated with the movie trailer. A voting prompt may ask for a user to vote "yes" or "no" as to whether the user would like to watch the movie associated with the movie trailer, or may ask the user to vote "yes", "no", or "maybe" as to whether the user would like to watch the movie associated with the movie trailer. Once a user has provided user feedback, movie application 170 may send a message to movie application server 132 that includes the user feedback. Movie application server 132 may then store the user feedback in the user account associated with a mobile device 110 from which the user feedback was received. If positive user feedback is received for a movie trailer, movie application server 132 may add the associated movie to a viewing list for the associated user account.

In some instances, a movie studio may produce multiple movie trailers for the same movie. Accordingly, a digital fingerprint may math digital fingerprints of multiple movie trailers. If matches to digital fingerprints of multiple movie trailers are identified, then movie trailer identifier 175 may continue generating digital fingerprints from audio data and comparing these digital fingerprints to additional digital fingerprints of the movie trailers for which matches were identified. This process may continue until there is only one movie trailer having digital fingerprints that match the digital fingerprints of the audio data 105. User feedback may be correlated to specific movie trailers of movies, which may enable AB testing of movie trailers to determine which movie trailers generate the most user interest.

In an example, a movie trailer identifier 175 may generate a first digital fingerprint of a first portion of the audio data and compare that digital fingerprint to digital fingerprints of a plurality of known movie trailers 150A. The movie trailer identifier 175 may determine similarity values between the first digital fingerprint and the digital fingerprints of the plurality of known movie trailers. Movie trailer identifier 175 may then determine that the first similarity value between the first digital fingerprint and a second digital fingerprint associated with a first movie trailer satisfies a match criterion and may additionally determine that a second similarity value between the first digital fingerprint and a third digital fingerprint associated with a second movie trailer also satisfies the match criterion. Accordingly, the movie trailer identifier 175 may generate a fourth digital fingerprint of a second portion of the audio data. The movie trailer identifier 175 may then compare the fourth digital fingerprint to one or more additional digital fingerprints of the first movie trailer and to one or more additional digital fingerprints of the second movie trailer. If matches are found for both movie trailers, then still further digital fingerprints of portions of the audio data may be generated and compared to digital fingerprints of the first and second movie trailers. This process may continue until a match is only identified to one movie trailer.

Typically multiple movie trailers are played prior to a feature movie in a movie theater. Accordingly, in addition to outputting a prompt when a movie trailer ends, movie trailer identifier 175 may start generating additional digital fingerprints of audio data 105 at around the time that the movie trailer ends (e.g., shortly before the movie trailer is estimated to end). This enables digital fingerprints to be generated for a next movie trailer so that the next movie trailer may be identified and voted on or rated.

In one embodiment, movie trailer identifier 175 generates a digital fingerprint of audio data 105, and then compares the digital fingerprint to stored digital fingerprints of known movie trailers 150A. If no match is identified (e.g., the similarity values for comparisons between the digital fingerprint of the captured audio and digital fingerprints of known movie trailers all fail to satisfy a match criterion), then movie trailer identifier 175 sends the digital fingerprint of the audio data 105 to movie application server 132 for identification. A hosted movie trailer identifier 145 of a movie application server 132 may then compare the digital fingerprint to digital fingerprints of a larger set of known movie trailers 150B to identify the unknown movie trailer, as described below. Once a match is found between the digital fingerprint and a stored digital fingerprint of a known movie trailer, movie application server 132 may determine a time offset into the movie trailer that is associated with the matching digital fingerprint, determine a length of the movie trailers, and compute a time at which the movie trailer ends based on the time offset and the length of the movie trailer. The movie application server 132 may then send a message to the movie application 170 on the mobile device 110 that comprises an indication of the movie trailer that was identified, the time offset into the movie trailer for which an identification was made and a time at which the movie trailer ends. The movie application 170 may use this information to vibrate, prompt a user to vote on the movie trailer and/or increase a display brightness when the movie trailer ends.

Movie trailer identification and voting has been described with reference to a mobile device 110 that includes a movie application that includes movie voting logic 180. However, in some instances a mobile device 110 may lack a movie application 170 or may include a movie application that lacks a movie voting logic 180. In such instances, a mobile website may be used to provide the same functionality described with reference to the movie voting logic 180. In one embodiment, mobile device 110 uses a mobile web browser to navigate to a mobile website that provides a movie trailer voting experience. The mobile website may offer all of the same functionality as described with reference to the movie application 170. In an example, a message may be presented on the screen in the room 115 that prompts users to text a particular message (e.g., a short message service (SMS) message or a multimedia messaging service (MMS) message) to an identified address or phone number. The message may be sent using a messaging protocol such as SMS, MMS, email, iMessage®, WhatsApp®, GroupMe®, WeChat®, Facebook® Messenger, Google® Hangouts, and so on. The particular message may be or include a key that identifies a particular feature movie, that identifies a desire to access a movie trailer experience and/or that identifies a particular showing of a feature movie. Responsive to receiving the message, movie application server 132 may generate a link (e.g., a universal resource locator (URL) or hyperlink) to an instance of the movie voting website, and may send a response message to the mobile device 110. The response message may be sent using the same messaging protocol that the mobile device 110 used to send the initial message.

Alternatively, a different messaging protocol may be used.

Responsive to mobile device 110 receiving the response message, a user may select the link to navigate to the instance of the movie trailer voting website. This may cause the mobile device 110 to download data such as a JavaScript or other script that may perform one or more of the operations of movie voting logic 180.

In one embodiment, server computing device 130 includes a movie application server 132 and an event scheduler 140. Movie application server 132 may interface with one or more movie applications 170 to provide a movie trailer voting experience. Additionally, or alternatively, movie application server 132 may interface with mobile web browsers of mobile devices 110 to provide a movie trailer voting experience. In one embodiment, movie application server 132 includes a hosted movie trailer voting system 135, a movie trailer identifier 145 and a database of known movie trailers 150B.

Hosted movie trailer voting system 135 may provide the movie trailer voting experience described above to mobile devices 110 via a mobile website. Accordingly, a mobile device 110 may navigate to a movie trailer voting website provided by the hosted movie trailer voting system 135, and may receive a prompt requesting permission to activate and/or use the microphone of the mobile device 110. The mobile device 110 may then capture audio data 105 and send the audio data to hosted movie trailer voting system 135 (or generate digital fingerprints of the audio data and send the digital fingerprints to the hosted movie trailer voting system 135). Movie trailer identifier 145 may perform the same operations described with reference to movie trailer identifier 175 to identify a movie trailer. However, movie trailer identifier 145 may compare the generated digital fingerprints to digital fingerprints of a much larger database of known movie trailers 150B than movie application 170 has access to. The database (or other data store) containing the known movie trailers 150B may include data on a huge selection of known movie trailers, including movie trailers that were shown years or decades in the past. Accordingly, if movie trailer identifier 175 is unable to find a match between a generated digital signature and a digital signature of known movie trailers 150A, then the generated digital fingerprint(s) may be sent to movie application server 132 and compared by movie trailer identifier 145 to the digital fingerprints of known movie trailers 150B. Once movie trailer identifier 145 identifies a match to a movie trailer, movie application server 132 may send information about that identified movie trailer to mobile device 110, including metadata for the movie trailer (e.g., title, date of release of trailer, date of release of associated movie, length of movie trailer, time index for which a match was made, and so on).

Event scheduler 140 identifies users who may want to attend events together and facilitates scheduling of joint attendance of such events for those users. Event scheduler 140 may identify overlapping interest and schedule joint attendance for multiple types of events, including movie showings, plays, comedy shows, sporting events, musicals, and so on. Event scheduler 140 may identify user interest in attending an event from user interest data, which may include user feedback (e.g., user sentiment) about the event associated with user accounts (e.g., such as user accounts of movie application server 132). For example, event scheduler 140 may receive user feedback or sentiment associated with movie trailers, and determine from the user feedback movies that various users want to see. In another example, event scheduler 140 may receive purchase history for movies, sporting events, and so on, and may determine possible user interest in upcoming events based on the purchase history for past events. In another example, event scheduler 140 may receive click through data indicating users who have viewed ticket information for events but have not yet purchased tickets for those events. Other types of information may also be used to determine user interest in attending events. Additionally, combinations of different sources of user interest data may be used to determine user interest in attending events.

Event scheduler 140 additionally determines relationships between user accounts using one or more sources of relationship information. In one embodiment, event scheduler 140 receives address book information from mobile devices 110. Address book data from mobile devices 110 of multiple different users may be compared and/or correlated to identify users who are friends, family and/or acquaintances of other users. For example, a first user account may be associated with a first mobile device that includes a name that matches a user name associated with a second user account. Additionally, the address book of the mobile device associated with the second user account may include an address book that includes a name that matches the user name associated with the first user account. Based on this information, event scheduler 140 may determine that the first user account and second user account are of users that have some relationship to one another.

Some users may specify which other users they like to attend events with. Such declared relationships may also be used to identify possible users to attend events together.

In one embodiment, event scheduler 140 accesses a social network graph or other third party data set of a social network server 125 (or other third party) executing on server computing device 120 to determine relationship information about user accounts and associated users. In one embodiment, the third party data set includes profile information from a social network account of a user of a mobile device 110. Such profile information may be referred to as an online identity. The third party data set may be associated with a user account of a user on movie application server 132 and/or event scheduler 140, and may have been obtained from social network server 125. In one embodiment, the event scheduler 140 maintains a session with the social network server 125 for the social network accounts associated with one or more user accounts of the movie application server 132 and/or event scheduler 140. The event scheduler 140 may periodically or continuously receive status updates for the social network account of the users of the mobile devices 110 via the maintained sessions. Examples of social network services with which sessions may be maintained include LinkedIn®, Facebook®, Google+®, Myspace®, Pinterest®, Twitter®, and so on. Note that other types of third party data sets that are not from social network services may also be used for relationship determination purposes, such as association membership lists (e.g., for professional associations, business groups, Yahoo® groups, etc.), which may be provided by servers associated with the associations.

If the data from the third party data set satisfies a relationship criterion for a pair of user accounts, then event scheduler 140 determines that the pair of user accounts are of users who have a sufficiently close relationship that they might want to attend an event together. Examples of relationship criteria include relationship status between the social network account of a first user and a separate social network account associated with a second user. For example, relationship criteria may be satisfied if the social network account of one user has a "friends" or "family" relationship status with the social network account of the other user.

Once event scheduler 140 identifies two users who both have an interest (e.g., a high likelihood) of attending an event, event scheduler 140 sends messages to devices (e.g., mobile devices 110) of each of the users asking if they are interested in attending the event with the other user. Similarly, event scheduler 140 may identify larger groups of users (e.g., more than two users) who may want to attend an event together, and may separately message each of those users about the possibility of attending the event with the other identified users. If each of the messaged users responds that they are interested in attending the event with the other identified users, then event scheduler 140 may schedule joint attendance of the event for all of the identified users. This may include identifying a date and time of the event and guiding the users through purchase of tickets to the event.

In one embodiment, server computing device 130 further includes an interest notifier 142. Interest notifier 142 aggregates event interest data from multiple user accounts and determines interest levels for events. For events that occur repeatedly, such as movie showings and musical showings, interest notifier 142 may determine separate interest levels for each showing and/or for groups of showings. Interest levels may have varying levels of specificity, and may provide interest by region (e.g., state, county, zip code, city, theater, venue, etc.), time, date, date ranges, day of the week, and so on. For example, interest notifier 142 may determine interest levels for all showings on the same day, all showings on a particular day of the week (e.g., Fridays), all showings for a particular time, all showings for a particular time and day of the week, and so on. Interest levels may be sent to venues (e.g., to movie theaters), to movie studios, and/or to other third parties.

In one embodiment, interest notifier 143 determines a likelihood that a user will attend an event (e.g., will attend a showing of a movie). Interest notifier 142 may determine a likelihood that a user will attend an event based on user feedback and/or other types of interest data. In one embodiment, interest notifier 142 determines a likelihood that a user will attend a showing of a movie based on a user rating or voting of a movie trailer associated with the movie. For example, if a user gave a movie a rating of 5 out of 5, then it may be determined that there is a high likelihood that the user will see the movie. In one embodiment, interest notifier 142 determines a likelihood that a user will attend a showing of a movie based on a combination of user feedback for a trailer associated with the movie (e.g., a user voting or rating of the trailer), user feedback for other movie trailers, and actual user attendance of showings for the movies associated with the other movie trailers. For example, a correlation may be determined between user votes or ratings and actual attendance of movies voted on. In an example, a user may have indicated, based on voting on movie trailers, that they were interested in seeing 10 movies in the past. However, the user may have attended only 8 out of the 10 movies. Accordingly, interest notifier 142 may determine that the user has an 80% chance of attending a movie if that user votes that they want to see an upcoming movie based on their movie voting and attendance record. The likelihood that users will attend movie showings may be included in the reports of interest levels.

Figure 2A:
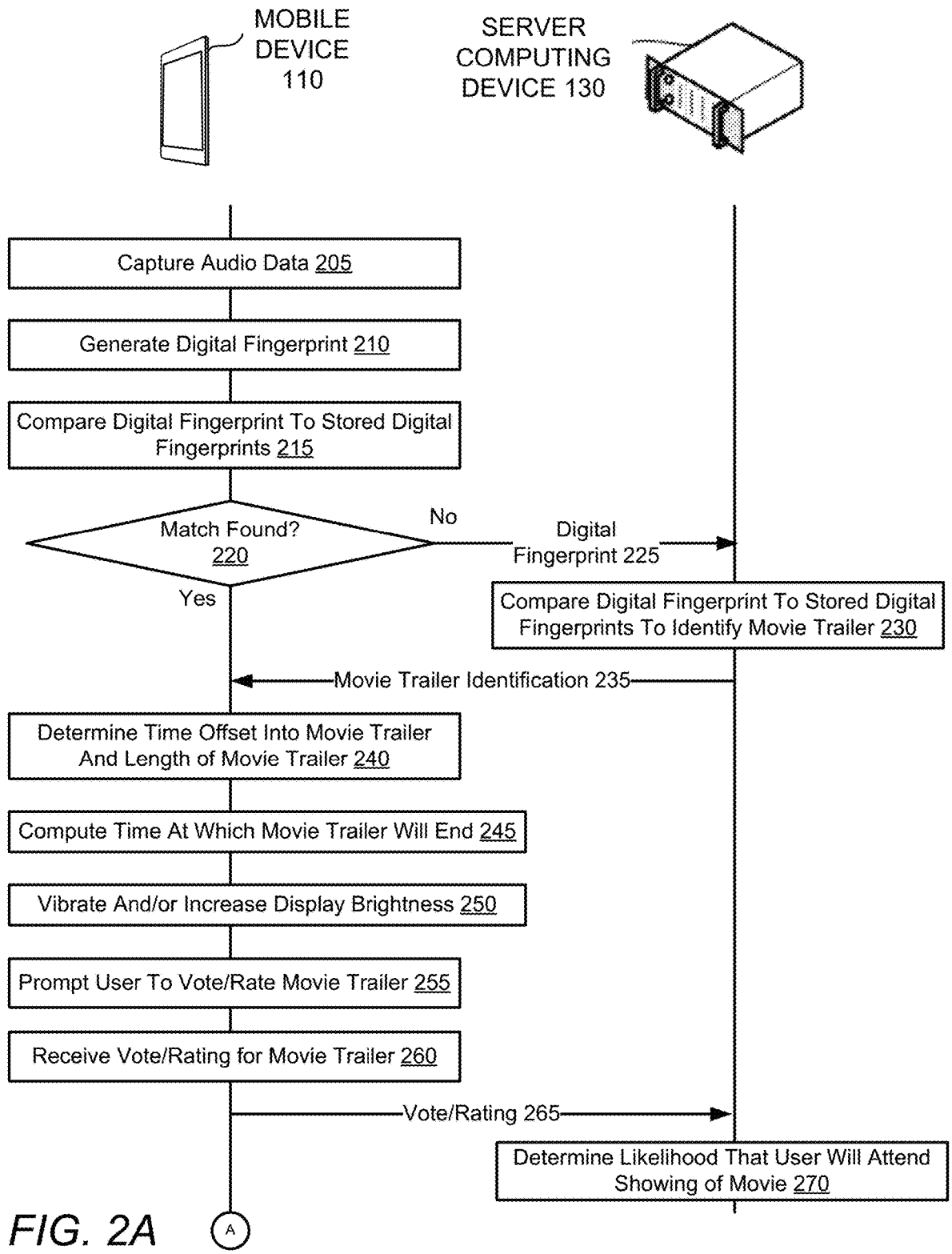
FIGS. 2A-B are sequence diagrams illustrating a movie trailer voting process, according to an embodiment.
Figure 2B:
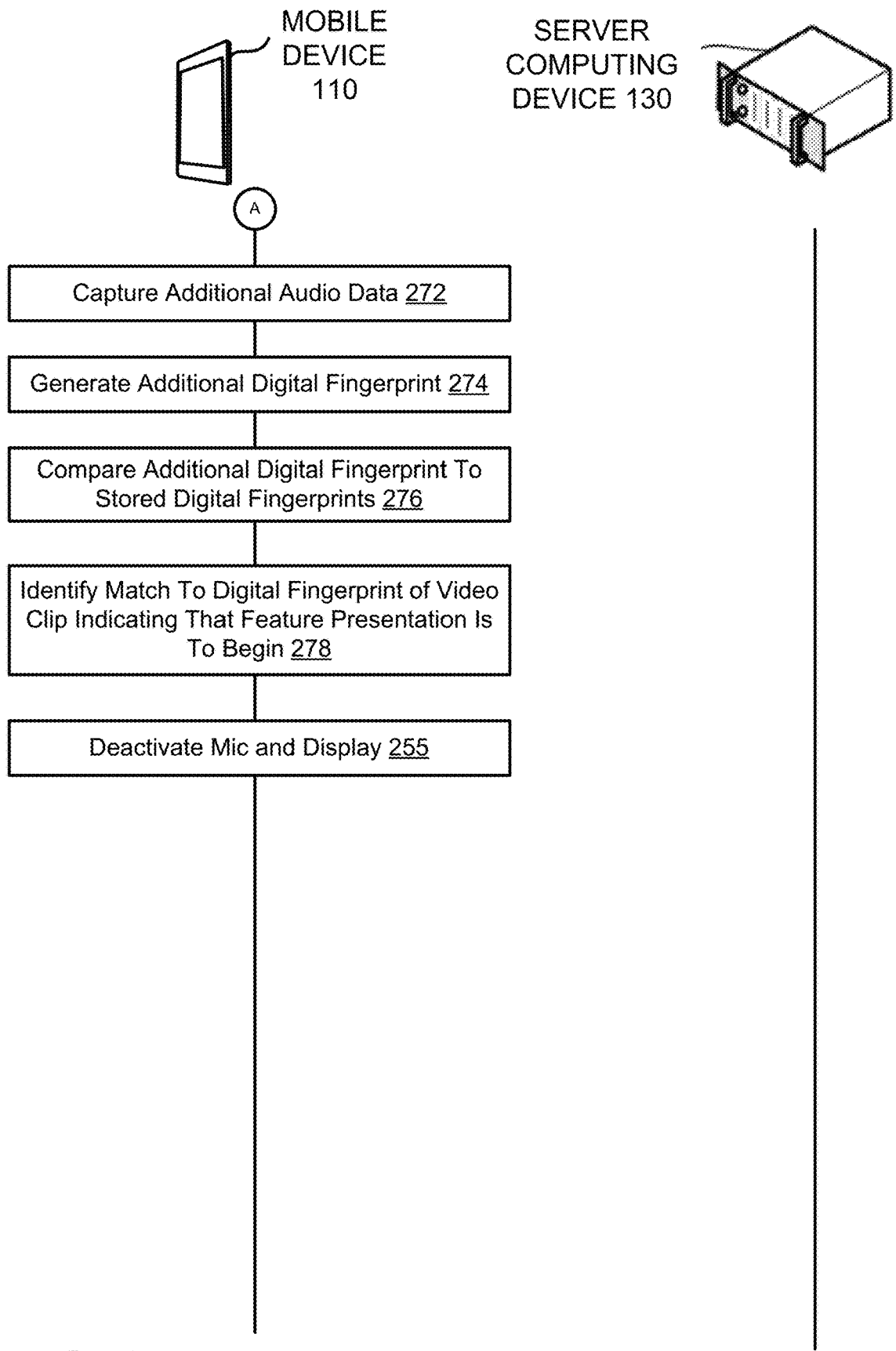

FIGS. 2A-B are sequence diagrams illustrating a movie trailer voting process, according to an embodiment. The sequence diagrams include a mobile device 110 and server computing device 130, each of which may perform one or more operations for the movie trailer voting process. The movie trailer voting process may begin with mobile device 110 capturing audio data at block 205, where the captured audio data includes a sample of an audio track associated with an unknown movie trailer. At block 210, the mobile device 110 generates a digital fingerprint of the captured audio data. In one embodiment, the mobile device 110 generates a digital fingerprint of a portion of the captured audio data.

At block 215, the mobile device 110 compares the digital fingerprint to stored digital fingerprints associated with known movie trailers. At block 220, the mobile device 110 determines whether a match is found between the digital fingerprint and a digital fingerprint of one of the known movie trailers. If no match is found, then the digital fingerprint is sent to server computing device 130 at block 225. Server computing device 130 then compares the digital fingerprint to stored digital fingerprints of a larger selection of known movie trailers to identify the movie trailer at block 230. Server computing device then sends a message to mobile device that includes an identification of the movie trailer that was identified at block 235. The message may further include additional information about the movie trailer, such as a time index in the movie trailer associated with the portion of the movie trailer for which the identification was made and/or a length of the movie trailer.

If a match is found at block 220, or if a message that includes the movie trailer identification is received, then at block 240 the mobile device determines a time offset into the movie trailer and a length of the movie trailer. The time offset may represent a current time position in the playback of the movie trailer. At block 245, the mobile device computes a time at which the movie trailer will end (e.g., by subtracting a time offset associate with the matching digital fingerprint from the length of the movie trailer). Alternatively, the operations of blocks 240 and 245 may be performed by server computing device 130.

At block 250, the mobile device vibrates, increases a display brightness and/or outputs a push notification at the time that the movie trailer was predicted to end. This may draw a user's attention to the mobile device. Alternatively, the mobile device may determine a second time that is within a threshold distance in time from the computed time. The threshold may be, for example, 2-4 seconds from the computed time. For example, the mobile device may vibrate and/or increase a display brightness 2 seconds before the movie trailer ends or 2 seconds after the movie trailer ends. At block 255, the mobile device generates a prompt for the user to vote on and/or rate the movie trailer. In one embodiment, the prompt is output upon identification of the movie trailer. Alternatively, the prompt may be output once the movie trailer ends.

At block 260, the mobile device 110 receives a vote and/or rating for the movie trailer (e.g., receives user sentiment or user feedback). At block 265, the mobile device 110 sends the vote or rating to the server computing device. The mobile device 110 may also store the vote or rating on the movie trailer. In some instances, a user may choose not to vote on or rate a movie trailer. In such an instance, the mobile device 110 may send information that indicates a movie trailer that was viewed but that lacks user feedback. At block 270, the server computing device determines a likelihood that a user will attend a showing of the movie associated with the movie trailer. Alternatively, or additionally, mobile device 110 may determine the likelihood that the user will attend the showing of the movie. User feedback or sentiment itself may indicate the likelihood that the user will attend the movie. Alternatively, the likelihood that the user may attend the movie may be determined based at least in part on the user feedback. A user history may be examined to determine a ratio of a particular user vote or rating to the user attending movies in the past, and this ratio may be used to determine a likelihood that the user will attend the movie associated with the movie trailer based on the vote or rating for that movie trailer. For example, a user may have rated 10 movie trailers with a 1 and not gone to see any of those movies. Accordingly, a 0% chance that the user will attend the movie may be determined from a rating of 1 for the movie trailer. In another example, a user may have rated 10 movie trailers with a 4, and may have attended 9 of those movies. Accordingly, a 90% chance that the user will attend the movie may be determined from a rating of 4 for the movie trailer.

At block 272, the mobile device 110 captures additional audio data. At block 274, the mobile device generates an additional digital fingerprint of the additional audio data. At block 276, the mobile device compares the additional digital fingerprint to stored digital fingerprints of known movie trailers as well as to stored digital fingerprints of clips played by theaters after previews of trailers are finished and before a feature presentation. For example, movie theaters often show clips such as "silence is golden" and "turn off cell phones" prior to showing a feature presentation. At block 278, the mobile device 110 identifies a match between the generated digital fingerprint and a digital fingerprint of a video clip indicating that the feature presentation is about to begin. At block 255, the mobile device may deactivate a microphone of the mobile device and/or a display of the mobile device.

In one embodiment, after detecting the match to the digital fingerprint of the video clip indicating that the feature presentation is about to begin, the mobile device 110 continues to sample audio data until, generate digital fingerprints, and compare the digital fingerprints to digital fingerprints of the introductory clips of known movies until a match is identified. This may enable the feature presentation to be identified and reported to server computing device 130 along with the voting and/or ranking for one or more movie trailers. This may enable server computing device 130 to correlate voting/ranking of movie trailers with feature presentations as well as user accounts.

Figure 3A:
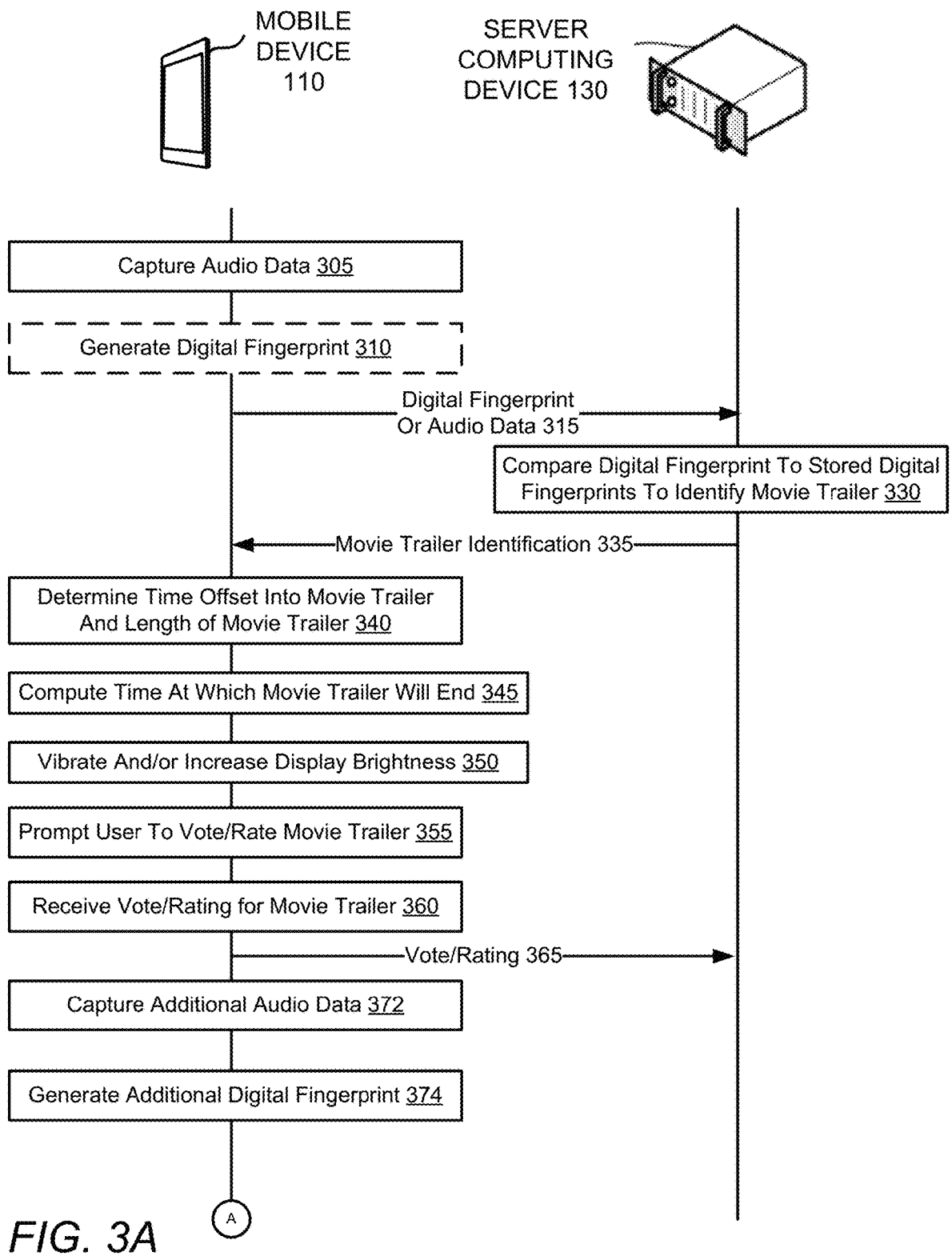
FIGS. 3A-B are sequence diagrams illustrating a movie trailer voting process, according to an embodiment.
Figure 3B:
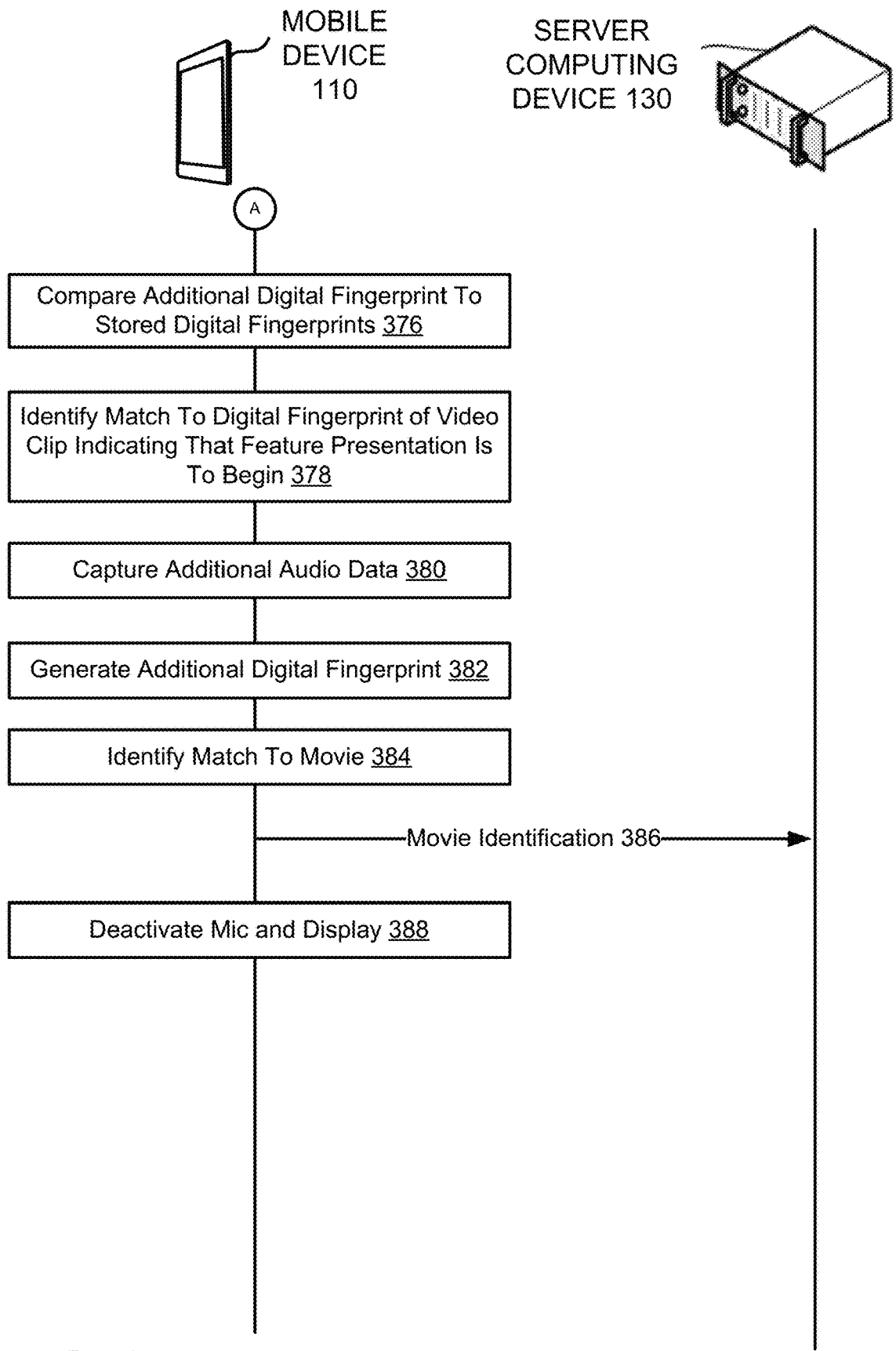

FIGS. 3A-B are sequence diagrams illustrating a movie trailer voting process, according to an embodiment. The sequence diagrams include a mobile device 110 and server computing device 130, each of which may perform one or more operations for the movie trailer voting process. The movie trailer voting process may begin with mobile device 110 capturing audio data at block 305, where the captured audio data includes a sample of an audio track associated with an unknown movie trailer. At block 310, the mobile device 110 may generate a digital fingerprint of the captured audio data. In one embodiment, the mobile device 110 generates digital fingerprints of one or more portions of the captured audio data.

At block 315, mobile device 110 sends the captured audio data or one or more digital fingerprints of the captured audio data to server computing device 130. Server computing device 130 then compares the one or more digital fingerprints to stored digital fingerprints of known movie trailers to identify the movie trailer at block 330. Server computing device then sends a message to mobile device that includes an identification of the movie trailer that was identified at block 335. The message may further include additional information about the movie trailer, such as a time index in the movie trailer associated with the portion of the movie trailer for which the identification was made and/or a length of the movie trailer.

At block 340, the mobile device determines a time offset into the movie trailer and a length of the movie trailer. The time offset may represent a current time position in the playback of the movie trailer. At block 345, the mobile device computes a time at which the movie trailer will end. Alternatively, the operations of blocks 340 and 345 may be performed by server computing device 130.

At block 350, the mobile device vibrates, increases a display brightness and/or outputs a push notification at the time that the movie trailer was predicted to end. This may draw a user's attention to the mobile device. In some embodiments, the mobile device may be paired with a wearable device or other mobile device (e.g., such as a smart watch). The wearable device may have its own display, which may be a touch display. In such an instance, the mobile device may send an instruction to the wearable device or other mobile device to cause that device to vibrate, increase display brightness, etc. The wearable device or other mobile device may then vibrate, increase display brightness, etc. in addition to or instead of the mobile device. At block 355, the mobile device generates a prompt for the user to vote on and/or rate the movie trailer. In one embodiment, the prompt is output upon identification of the movie trailer. Alternatively, the prompt may be output once the movie trailer ends. In one embodiment, in which the mobile device is paired with a wearable device or other mobile device, the wearable device or other mobile device outputs the prompt instead of or in addition to the mobile device.

At block 360, the mobile device 110 receives user feedback such as a vote and/or rating for the movie trailer. In one embodiment, in which the mobile device is paired with a wearable device or other mobile device, the wearable device or other mobile device receives the user feedback and sends the user feedback to the mobile device. At block 365, the mobile device 110 sends the user feedback to the server computing device.

At block 372, the mobile device 110 captures additional audio data 372. At block 374, the mobile device generates one or more additional digital fingerprints of the additional audio data. At block 376, the mobile device compares the one or more additional digital fingerprints to stored digital fingerprints of known movie trailers as well as to stored digital fingerprints of clips played by theaters after previews of trailers are finished and before a feature presentation. Alternatively, mobile device 110 may send the digital fingerprints to server computing device 130 for comparison to stored digital fingerprints of movies. At block 378, the mobile device 110 identifies a match between the generated digital fingerprint and a digital fingerprint of a video clip indicating that the feature presentation is about to begin. Alternatively, the match may be identified by server computing device 130, after which server computing device 130 may send an instruction to mobile device 110 indicating that the feature presentation is about to begin.

At block 380, mobile device 110 captures additional audio data. At block 382, mobile device 110 generates one or more additional digital fingerprints of the additional audio data. At block 384, the mobile device identifies a match to the feature presentation. This may include comparing the generated digital fingerprints of the feature presentation to stored digital fingerprints of the introductory scenes of multiple known movies. In one embodiment, mobile device 110 sends the audio data and/or digital fingerprints to server computing device 130, and server computing device 130 makes the comparison and determines the match. Alternatively, mobile device 110 may make the comparison and determine the match, after which mobile device 110 may report the identified movie to server computing device 130 at block 386. At block 388, the mobile device may deactivate a microphone of the mobile device and/or a display of the mobile device.

Figure 4:
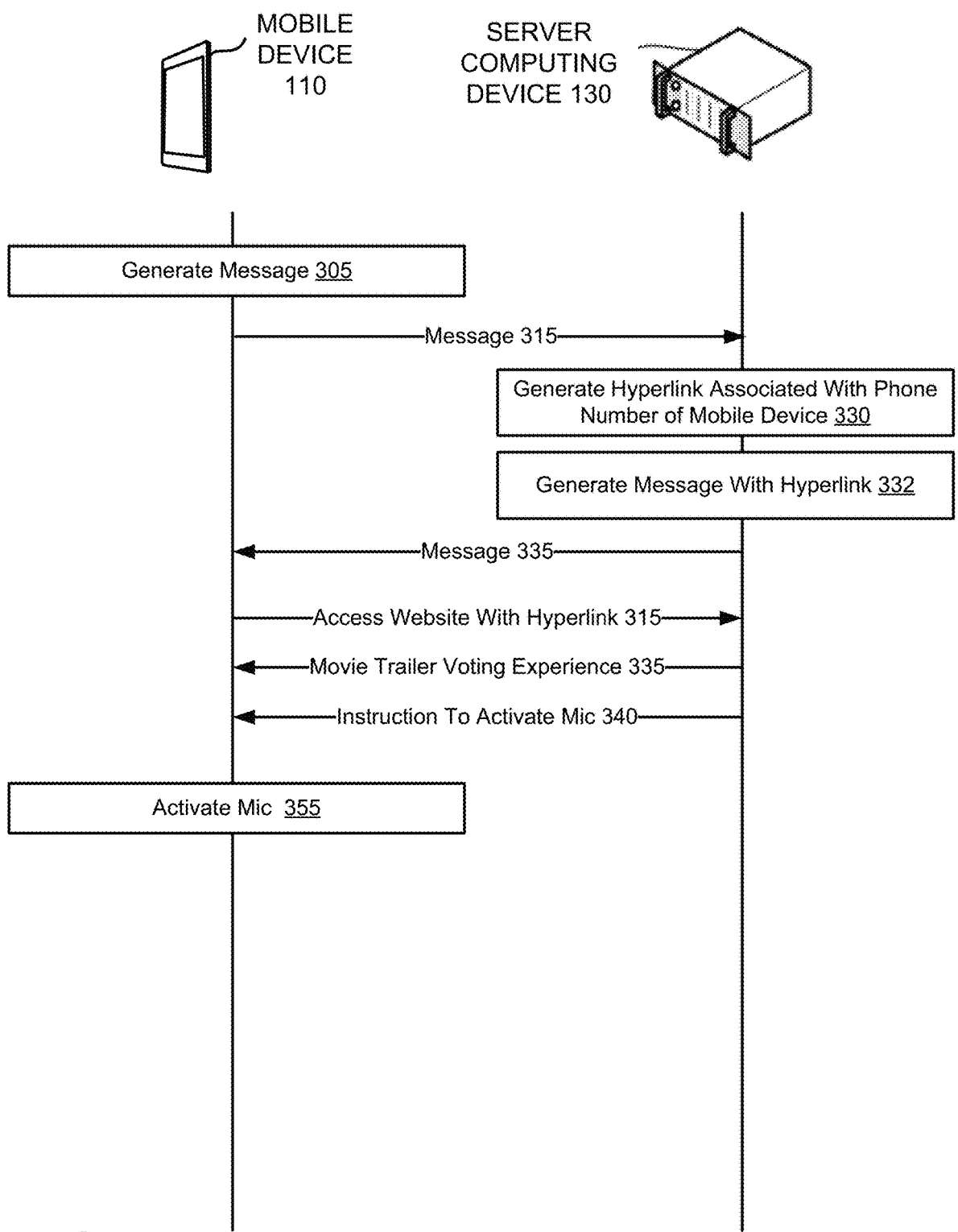
FIG. 4 is a sequence diagram illustrating the use of a mobile website for movie trailer voting, according to an embodiment.

FIG. 4 is a sequence diagram illustrating the use of a mobile website for movie trailer voting, according to an embodiment. The sequence diagram includes a mobile device 110 and server computing device 130, each of which may perform one or more operations for the movie trailer voting process. The process illustrated in FIG. 4 may be performed prior to the processes illustrated in one or more of FIGS. 2A-2B and FIGS. 3A-3B in embodiments.

At block 405, mobile device 110 generates a message. The message may be generated on the mobile device by a user in response to a clip played at a movie theater directing users to send a particular message to a particular phone number if they want to vote on or rate movie trailers. At block 315, the mobile device 110 sends the message to the server computing device 130. The message may be, for example, an SMS or MMS message to a phone number associated with the server computing device 130.

At block 330, the server computing device 130 generates a hyperlink (or other link) associated with the phone number of the mobile device. In one embodiment, the hyperlink includes a hash of a phone number of the mobile device 110. At block 332, the server computing device 130 generates a message that includes the generated link (e.g., the generated hyperlink). At block 335, the server computing device sends the generated message to the mobile device 110. In one embodiment, the message sent at block 335 is sent using a same messaging protocol as the message sent at block 315. Alternatively, different messaging protocols may be used.

At block 315, the mobile device 110 executes a web browser and accesses a movie trailer voting website using the hyperlink (or other link) provided in the message received by mobile computing device 110. At block 335, the server computing device downloads content to the mobile device 110 that enables a movie trailer voting experience. This may include downloading one or more hypertext markup language (HTML) pages, one or more cascading style sheets (CSS) and/or one or more scripts (e.g., JavaScript scripts). At block 340, the server computing device 130 may additional send an instruction to activate a microphone of the mobile device 110. At block 355, the mobile device 110 activates the microphone. This may be performed after providing a prompt asking for permission to use the microphone, and receiving authorization to use the microphone. The operations described with FIGS. 2A-2B and/or 3A-3B may then be performed to enable a user to vote on one or more movie trailers.

Figure 5:
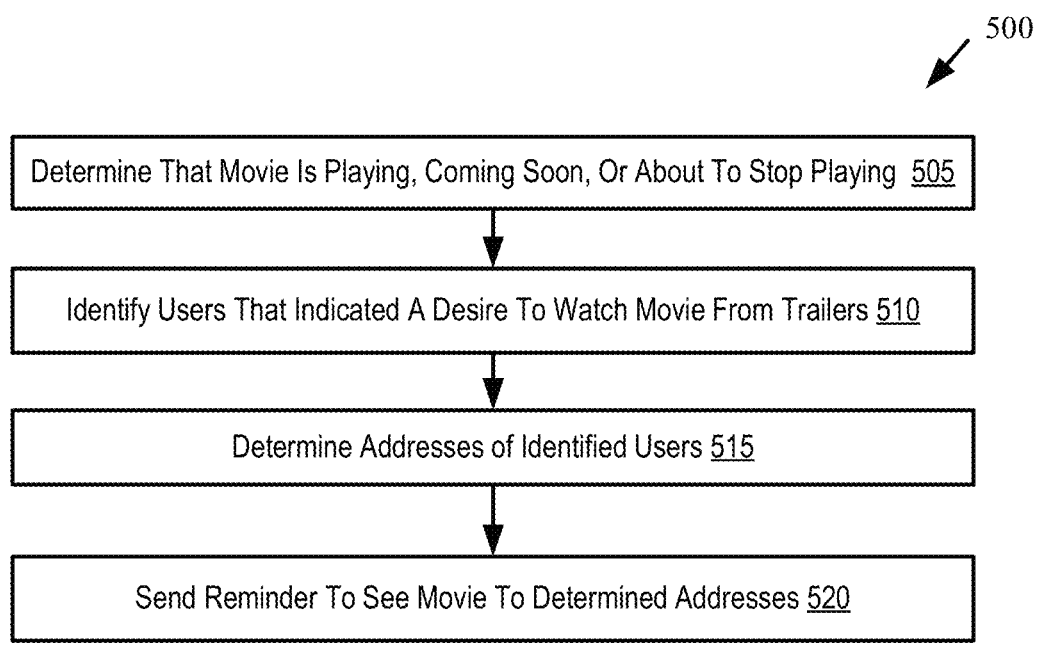
FIG. 5 is a flow diagram illustrating a method of reminding users to view a movie, according to an embodiment.

FIG. 5 is a flow diagram illustrating a method 500 of reminding users to view a movie, according to an embodiment. Method 500 may be performed by processing logic that comprises hardware (e.g., circuitry, dedicated logic, programmable logic, microcode, etc.), software (e.g., instructions run on a processor), firmware, or a combination thereof. The method 500 may be performed, for example by server computing device 130 of FIG. 1 in embodiments.

After a user has provided user feedback that indicates that the user is interested in watching a movie based on a movie trailer viewed by the user, that user may forget about the movie. Processing logic may determine from the user feedback that the user has a high likelihood of attending a showing of the movie. A high likelihood may be determined if a chance of the user viewing the movie is greater than a threshold. The threshold may be, for example, 50%, 60%, 70%, 80%, and so on. Accordingly, in embodiments positive user feedback indicative that a user would like to watch a movie is stored and later used to send reminders to the user to watch the movie.

In one embodiment, at block 505 of method 500 processing logic determines that a movie is playing, coming soon, or about to stop playing. At block 510, processing logic identifies a set of users who indicated a desire to watch the movie from viewing movie trailers associated with the movie and voting on those movie trailers. Alternatively, or additionally, processing logic may predict that a user might want to watch a movie based on their votes on other movies. For example, if a user voted in the past that they wanted to watch each of the Marvel® movies that were coming out, then a determination may be made that the user might want to watch a new super hero movie being released. At block 515, processing logic determines addresses (e.g., email addresses, social network accounts, etc.) and/or phone numbers associated with the identified users. Such information may be included in user accounts of the users. At block 520, processing logic sends reminders and/or encouragements to see the movie to each of the determined addresses and/or phone numbers.

In one embodiment, after a user expresses interest in seeing a movie based on a vote or rating of a movie trailer, that movie is added to a movie list for the user. The movie list may be saved both on a server computing device as well as on a mobile device of the user. When the user opens a movie application, the list of movies that they have indicated interest in seeing may be shown to the user as a reminder.

Figure 6:
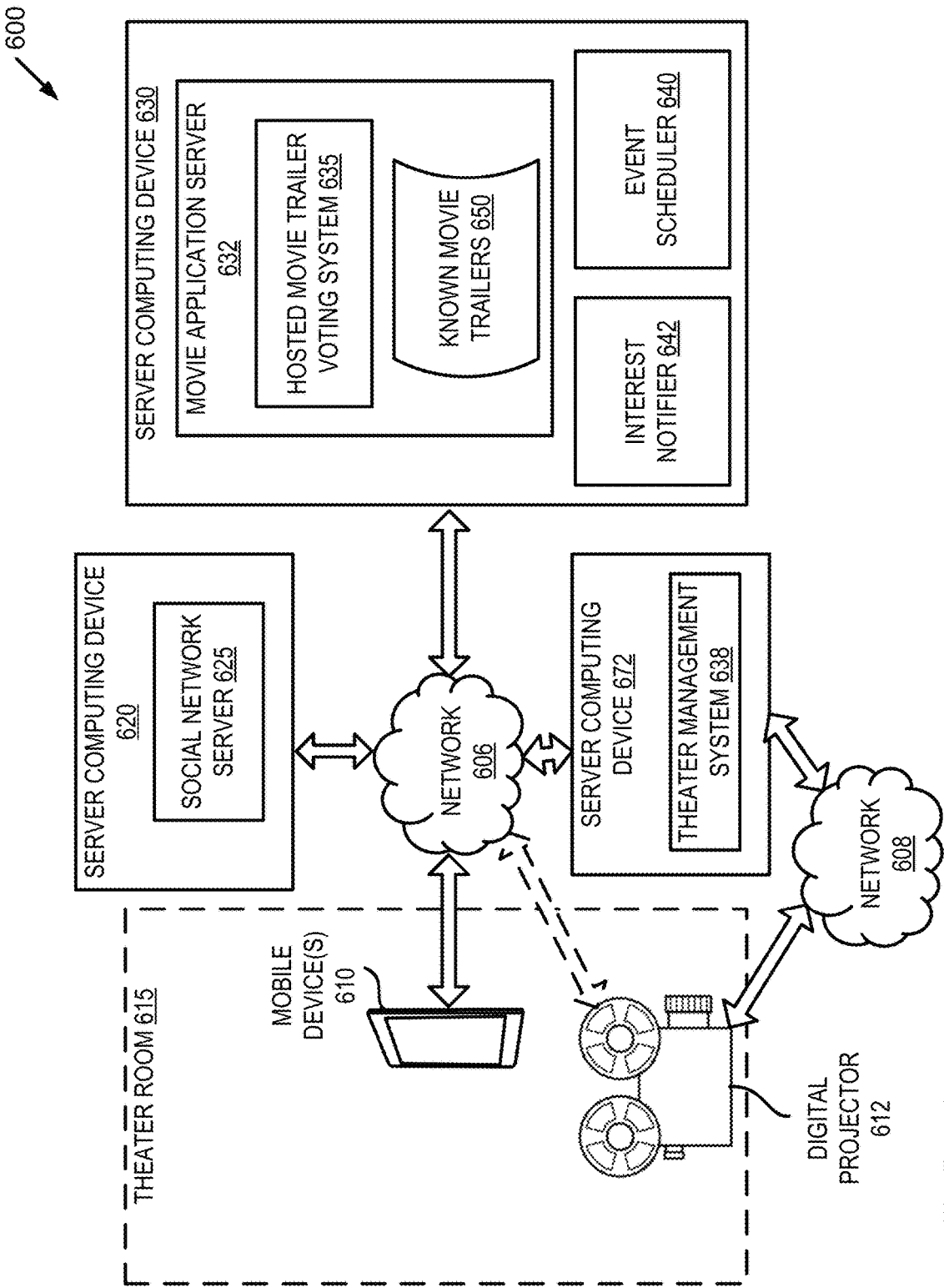
FIG. 6 is a block diagram illustrating a network environment in which embodiments of the present invention may operate.

FIG. 6 is a block diagram illustrating a network environment 600 in which embodiments of the present invention may operate. In one embodiment, network environment 600 includes a digital projector 612, one or more mobile devices 610, a server computing device 620, a server computing device 630, and network 606 over which the mobile devices 610, digital projector 612 and/or server computing devices 620, 630 may communicate. In one embodiment, the network environment 600 further includes a server computing device 672 connected to the network 606 and to digital projector 612 by a network 608. The network 606 and network 608 may each include a local area network (LAN), a wireless network, a telephone network, a mobile communications network, a wide area network (WAN) (e.g., such as the Internet) and/or similar communication system. The networks 606, 608 can include any number of networking and computing devices such as wired and wireless devices. In one embodiment, network 606 is a public network such as the Internet, and network 608 is a private network such as an intranet or a local area network (LAN).

The server computing device 620, server computing device 672 and server computing device 630 may include a physical machine and/or a virtual machine hosted by a physical machine. The physical machine may be a rackmount server, a desktop computer, or other computing device. In one embodiment, the server computing devices 620, 630, 672 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Mobile devices 610 are mobile computing devices such as an electronic book reader, portable digital assistant, mobile phone, laptop computer, portable media player, tablet computer, camera, video camera, netbook, notebook, and the like. Mobile devices 610 may include a memory, a processing device (e.g., one or more microprocessor), a display, a microphone, speakers, and so on.

Digital projector 612 is a digital movie projector that receives digital movie files for playback and that plays or projects movies from the received digital movie files. Digital projector 612 and/or associated theater management system 638 may receive digital movie files from network 606 and/or from a dedicated satellite link. Digital projector 612 may include a digital light processing (DLP) device, one or more network adapters for connecting to network 606, a processing device, a memory, a solid state drive and/or disk drive, and/or other components commonly found in computing devices.

The playback of the content by digital projector 612 may be controlled by a playlist. The playlist is a list of all the content that is to be played as part of the performance of a feature presentation, including movie trailers and/or other video clips. In addition to listing the content to be played the playlist may also include time indexes of when particular content is to be played, lengths of content (e.g., clips, movie trailers and/or feature movie), automation that allow the playlist to control the digital projector, a sound system in theater room 615, auditorium lighting in theater room 615, tab curtains and screen masking (if present) in theater room 615, etc. The playlist can be started manually, by clicking the "play" button on the digital projector 612 (or server computing device 672 that interfaces with the digital projector 612), or automatically at pre-set times.

In one embodiment, digital projector 612 is controlled by a theater management system 638 that executes on server computing device 672. The theater management system 638 may additionally control other digital projectors at the same theater as digital projector 612 and/or at different theaters. The server computing device may be a local server computing device located at a theater that includes digital projector 612 or may be a remote server computing device. The theater management system 638 may generate a playlist and send the playlist to digital projector 612. Alternatively, theater management system 638 may store a playlist and send instructions to the digital projector 612 to play a particular video, movie or clip at a given time. When one video, clip or movie ends, theater management system 638 may send a new instruction to play a next video, clip or movie.

Each mobile device 610 may include installed thereon a movie application (not shown). The movie application may include a graphic user interface (GUI), movie voting logic and/or data for one or more known movie trailers. The graphic user interface may provide a menu of display options. A user may navigate the GUI by selecting (e.g., pressing buttons associated with) options to preview movies playing in theaters, view trailers, purchase movie tickets, and so on. A user may select to organize or filter movies by location, movie, genre, playtime, and so on. The movie application on each mobile device 610 is associated with a particular user account of a movie application server 632. The movie application may log into the movie application server 632 using credentials associated with a particular user account.

In one embodiment, the movie application includes a movie voting logic. The movie voting logic enables users to vote on or rank movie trailers. The ranking or voting applied to a movie trailer for a user account indicates user sentiment about a movie represented in the movie trailer.

Digital projector 612 and/or theater management system 638 may include a playlist of movie trailers, video clips and/or a feature movie to be played. When the digital projector 612 begins executing the playlist (or a movie trailer, video clip or movie from the playlist), the digital projector 612 may send a message to movie application server 132 indicating that execution of the playlist is commencing. Alternatively, a theater management system 638 that controls digital projector 612 may send the message to the movie application server 132 when it sends an instruction to the digital projector 612 to begin execution of the playlist or of a particular movie trailer, video clip or movie in the playlist. The message may include the playlist and/or a playlist identifier that can be used by movie application server 632 to look up the playlist. Alternatively, the message may include an identifier of a single movie trailer, video clip or movie to be played next.

In one embodiment, server computing device 630 includes a movie application server 632 and an event scheduler 640. Movie application server 632 may interface with one or more movie applications 670 to provide a movie trailer voting experience. In one embodiment, movie application server 632 includes a hosted movie trailer voting system 635 that interfaces with mobile web browsers of mobile devices 610 to provide a movie trailer voting experience.

Movie application server 632 may determine those mobile devices 610 that are located in theater room 615. In one embodiment, the mobile devices 610 include movie applications, and the movie applications communicate geolocation information to application server 632, which application server 632 may use to determine a location of the mobile devices 610. In one embodiment, the theater room 615 includes a wireless transmitter (e.g., a Bluetooth transmitter) that broadcasts a unique identifier. Different theater rooms of the same and different theaters may include wireless transmitters that broadcast different unique identifiers. Mobile devices 610 that include the movie application may receive the broadcast of the unique identifier and send a message to movie application server 632 comprising the unique identifier.

Alternatively, the unique identifier might be digitally embedded in the video (e.g., movie trailer) being played by the digital projector. The unique identifier may be an audio identifier that is not audible to humans (e.g., an ultrasonic audio code). In such an instance, mobile devices 610 that include the movie application may receive audio of a movie trailer, and a decoder in the movie application may determine the unique identifier from the audio (e.g., convert an audio code into non-audio data such as text/numerical data) and send a message to the movie application server 632 comprising the unique identifier. The unique identifier may have been encoded into an audio format using one or more audio modulation schemes such as frequency shift keying, phase shift keying, pulse modulation, and so on.

Movie application server 632 may then determine that the mobile devices 610 are in the theater room 615 based on the unique identifier. In one embodiment, users purchase movie tickets from the movie applications on their mobile devices 610 or online using user accounts associated with the movie application on their mobile devices. In some embodiments, movie tickets may be purchased without user accounts using pay systems such as Apple® Pay. The movie ticket purchases may be for a particular location and show time. The particular location and show time may be used to determine that the users (and their mobile devices 610) are in the theater room 615.

Responsive to receipt of the message from the digital projector 612 or theater management system 638 by movie application server 632, movie application server 632 may determine from the playlist a sequence of movie trailers that will be played and/or a next movie trailer to be played. Movie application server 632 may additionally determine information about the movie trailers in the playlist, such as lengths of the movie trailers, from a data store of known movie trailers 650. Alternatively, the lengths of the movie trailers may be indicated by, or determinable from, the playlist. Movie application server 632 may send messages to the mobile devices 610 in the theater room 615 responsive to receipt of the message from the digital projector 612 (or computing device that controls the digital projector). The messages may contain the sequence of movie trailers along with lengths of each of the movie trailers. Alternatively, the messages may contain an indicator of a next movie trailer to be played and its length.

Mobile devices 610 may present a movie trailer voting display responsive to receipt of the message from the movie application server 132. The movie trailer voting display may include a movie trailer being played, a time offset into the movie trailer, and amount of time left in the movie trailer and/or a prompt for a user to provide user feedback about a movie trailer (e.g., to vote on or rate a movie trailer). Based on the received sequence of movie trailers and movie trailer lengths, a movie application on mobile devices 610 may determine when each of the movie trailers will end. At or around the predicted time at which a movie trailer will end, the movie application may prompt a user of mobile device to provide user feedback (e.g., user sentiment) about the movie trailer. The prompt may include a brightening of a display of the mobile device 610, a vibration of the mobile device 610 and/or an output of a push notification that is intended to draw the user's attention to the previously output prompt for user feedback.

If the received movie trailer sequence indicates that further movie trailers will be played, then the movie trailer voting display may again be shown so that the user may vote on a next movie trailer. This may be repeated until all movie trailers in the movie trailer sequence have been played.

Once a user has provided user feedback, the movie application on the mobile devices 610 may send a message to movie application server 632 that includes the user feedback. In one embodiment, user feedback for multiple movie trailers may be sent in a single message after some or all movie trailers in the playlist have been voted on. Movie application server 632 may then store the user feedback in the user account associated with a mobile device 610 from which the user feedback was received.

In one embodiment, digital projector 612 and/or theater management system 638 sends a message to movie application server 632 each time a new movie trailer begins. Movie application server 632 may then send a similar message to mobile devices 610 indicating that a new movie trailer has begun. In such an embodiment, digital projector 612 (or the computing device controlling digital projector 612) may or may not send the playlist to movie application server.

Movie trailer identification and voting has been described with reference to a mobile device 610 that includes a movie application. However, in some instances a mobile device 610 may lack a movie application or may include a movie application that lacks a movie voting logic. In such instances, a mobile website may be used to provide the same functionality described with reference to a movie application. In one embodiment, mobile device 610 uses a mobile web browser to navigate to a mobile website provided by hosted movie trailer voting system 635 that provides a movie trailer voting experience. The mobile website may offer all of the same functionality as described with reference to the movie application. In an example, a message may be presented on the screen in the theater room 615 that prompts users to text a particular message (e.g., a short message service (SMS) message or a multimedia messaging service (MMS) message) to an identified address or phone number. The message may be sent using a messaging protocol such as SMS, MMS, email, iMessage®, WhatsApp®, GroupMe®, WeChat®, Facebook® Messenger, Google® Hangouts, and so on. The particular message may be or include a key that identifies a particular feature movie, that identifies a desire to access a movie trailer experience and/or that identifies a particular showing of a feature movie. Responsive to receiving the message, movie application server 632 may generate a link (e.g., a universal resource locator (URL) or hyperlink) to an instance of the movie voting website, and may send a response message to the mobile device 610. The response message may be sent using the same messaging protocol that the mobile device 610 used to send the initial message. Alternatively, a different messaging protocol may be used.

Responsive to mobile device 610 receiving the response message, a user may select the link to navigate to the instance of the movie trailer voting website. This may cause the mobile device 610 to download data such as HTML, CSS, and/or JavaScript that may perform one or more of the operations described above. The link may direct the browser of the mobile device 610 to a website that is preloaded with the sequence of movie trailers and their lengths. Accordingly, the website may output a push notification to the mobile device, cause the display of the mobile device to brighten, cause the mobile device to vibrate, etc. as each movie trailer ends.

Event scheduler 640 corresponds to event scheduler 140 of FIG. 1. Accordingly, event scheduler 640 identifies users who may want to attend events together and facilitates scheduling of joint attendance of such events for those users. Event scheduler 640 may determine relationships between user accounts using one or more sources of relationship information. In one embodiment, event scheduler 640 accesses a social network graph or other third party data set of a social network server 625 (or other third party) executing on server computing device 620 to determine relationship information about user accounts and associated users, as described above with reference to FIG. 1.

Interest notifier 642 may perform the same operations of similarly named interest notifier 142 of FIG. 1.

Figure 7:
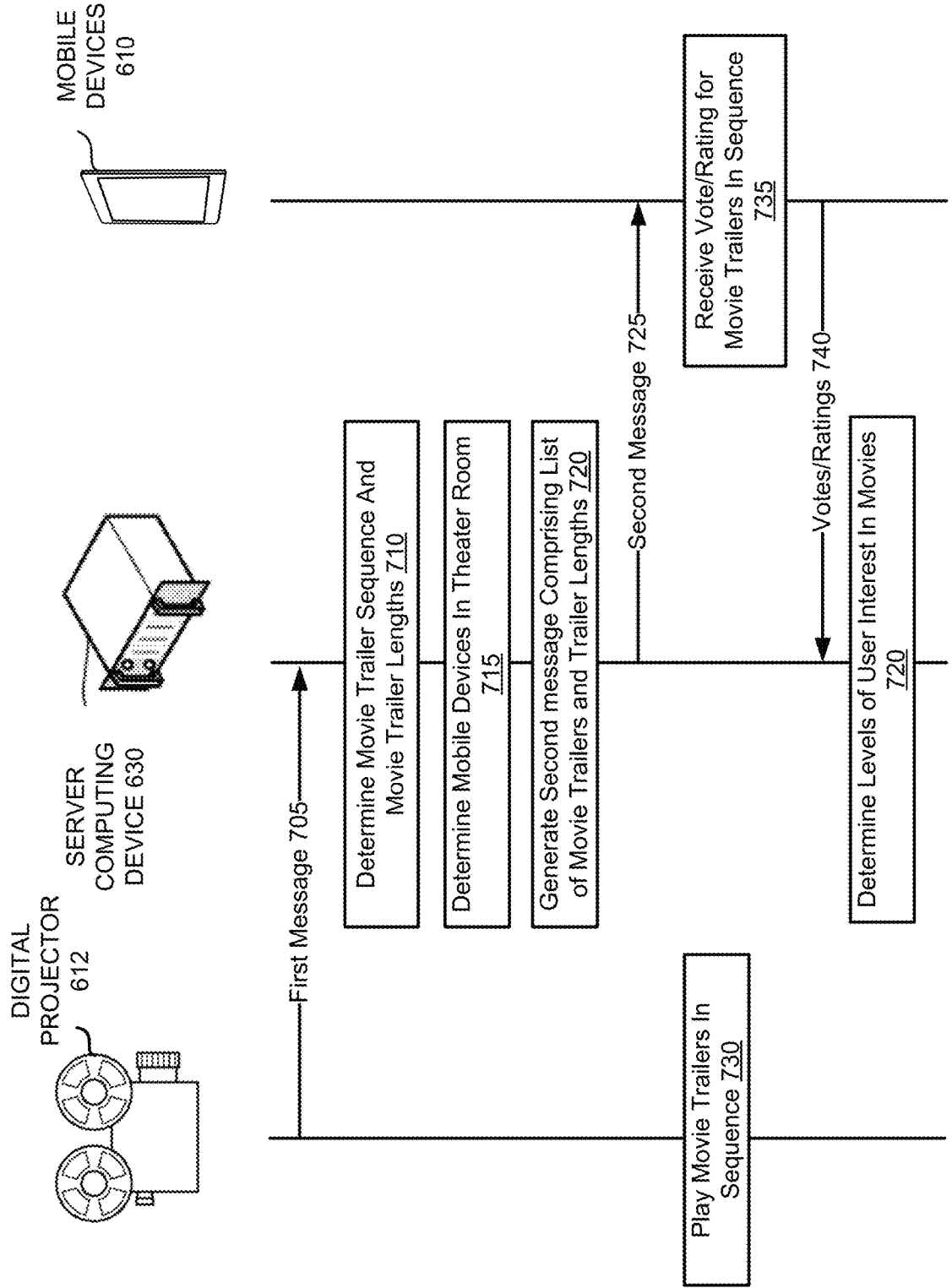
FIG. 7 is a sequence diagram illustrating a movie trailer voting process, according to an embodiment.

FIG. 7 is a sequence diagram illustrating a movie trailer voting process, according to an embodiment. The sequence diagram includes a digital projector 612, a server computing device 630, and a plurality of mobile devices 610, each of which may perform one or more operations for the movie trailer voting process. The movie trailer voting process may begin with digital projector 612 and/or theater management system 638 sending a first message to server computing device 630 at block 705. The first message may include a playlist associated with a feature presentation. Before, commensurate with, or after sending the first message at block 705, digital projector 612 may begin playing the movie trailers identified in the playlist in sequence (block 730). In one embodiment, theater management system 638 sends the first message 705 to server computing device 630 and also sends a command to digital projector 612 to begin playing a first movie trailer in the playlist. The command may include the playlist in an embodiment.

At block 710, the server computing device 630 determines a movie trailer sequence and movie trailer lengths for the movie trailers in the movie trailer sequence. At block 715, the server computing device 630 determines mobile devices that are in a theater room associated with digital projector 612. At block 720, the server computing device 630 generates a second message comprising the list of movie trailers and movie trailer lengths. The second message may also include an instruction to prompt a user to vote on or rate each of the movie trailers as each of the movie trailers ends.

At block 725, the server computing device 630 sends the second message to the plurality of mobile devices 610 in the theater room. At block 735, the mobile devices each prompt users for user feedback and receive such user feedback (e.g., votes and/or ratings) for the movie trailers in sequence. At block 740, the mobile devices then send the user feedback (votes/ratings) back to the server computing device. At block 720, the server computing device 630 may then determine levels of user interest in the movies associated with the movie trailers that were played by the digital projector 612.

In one embodiment, digital projector 612 is operatively coupled to a Bluetooth transmitter (or other wireless transmitter) in a theater room containing mobile devices 610. When each movie trailer is to begin, digital projector 612 may broadcast a message using the Bluetooth transmitter indicating that a new movie trailer is to begin. This may cause the mobile devices to prompt a user for user feedback regarding a movie trailer. Alternatively, or additionally, digital projector 612 and/or theater management system 638 may be operatively coupled to a wireless internet protocol (IP) network such as a Wi-Fi network. Digital projector 612 and/or theater management system 638 may send a message indicating that a new movie trailer is to begin via a push notification or wakeup signal using the wireless IP network.

Figure 8:
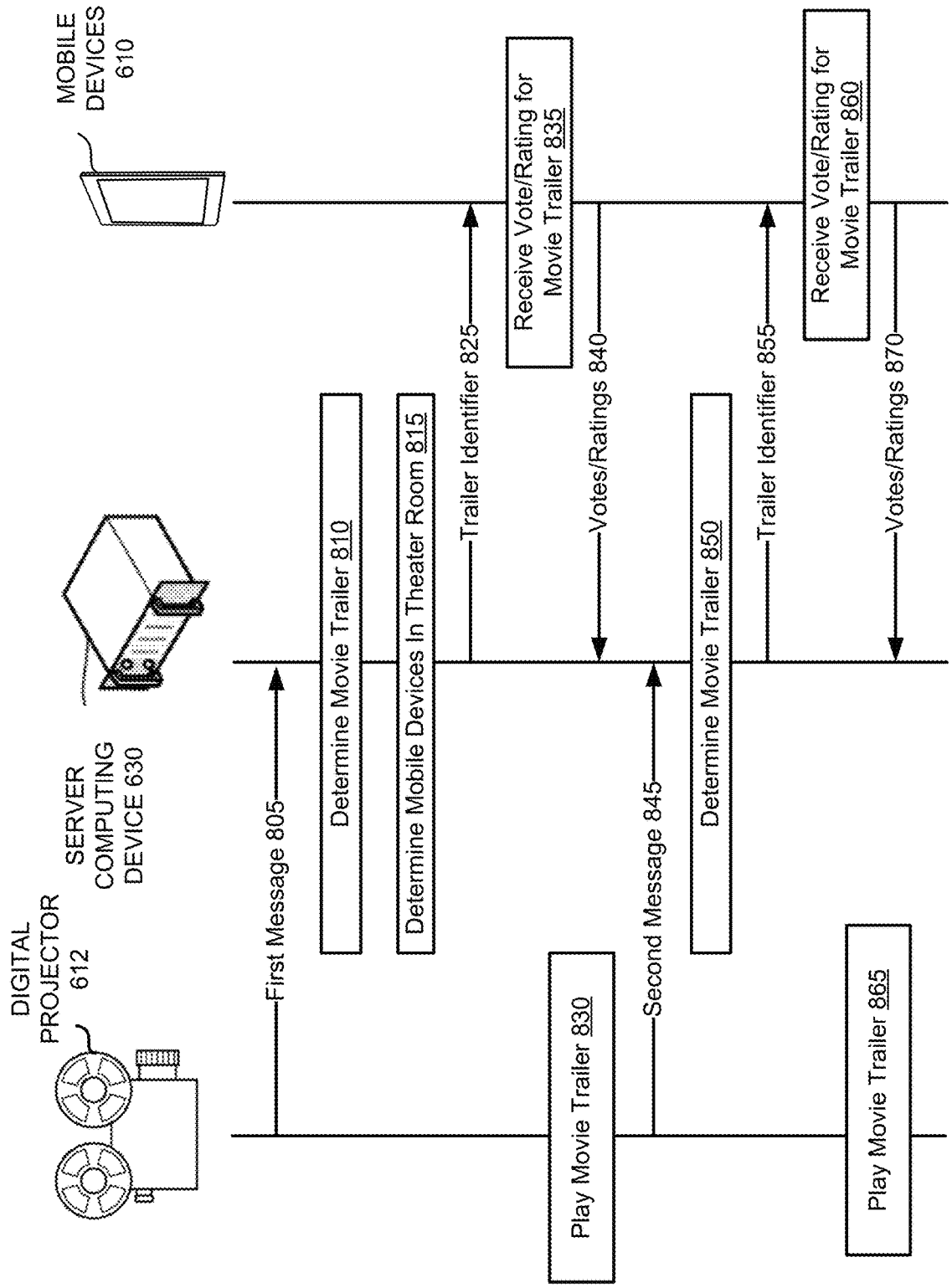
FIG. 8 is a sequence diagram illustrating a movie trailer voting process, according to an embodiment.

FIG. 8 is a sequence diagram illustrating a movie trailer voting process, according to an embodiment. The sequence diagram includes a digital projector 612, a server computing device 630, and a plurality of mobile devices 610, each of which may perform one or more operations for the movie trailer voting process. The movie trailer voting process may begin with digital projector 612 and/or theater management system 638 sending a first message to server computing device 630 at block 805. The first message may include a playlist associated with a feature presentation and/or may include an indication of a first movie trailer to be played. Before, commensurate with, or after the sending of the first message at block 805, digital projector 612 may begin playing the first movie trailer (block 830).

At block 810, the server computing device 630 may determine the first movie trailer and/or a length of the first movie trailer. At block 815, the server computing device 630 determines mobile devices that are in a theater room associated with digital projector 612. At block 825, the server computing device 630 generates a message comprising an identifier of the first movie trailer and/or a length of the first movie trailer.

At block 835, the mobile devices each prompt users for user feedback and receive such user feedback (e.g., votes and/or ratings) for the movie trailers. The prompt may be presented via a movie trailer voting display on the mobile devices 610. The movie trailer voting display may be shown upon receipt of the trailer identifier and/or when the first trailer ends. In one embodiment, mobile devices 610 determine when the first trailer will end based on a time stamp included in the first message and second message, which indicated when the digital projector 612 started playing the first trailer and the length of the first movie trailer (e.g., by adding the length of the first movie trailer to the time stamp to compute the end time). Mobile devices 610 may then prompt a user for feedback (e.g., by brightening a display and/or vibrating) when the movie trailer ends. Alternatively or additionally, mobile devices may show a movie trailer voting display when the movie trailer ends. The movie trailer voting display may include options (e.g., buttons) to select a rating and/or to vote on the movie trailer. The user may select the desired rating and/or vote, which may constitute user feedback. At block 840, the mobile devices then send the user feedback (votes/ratings) for the first movie trailer back to the server computing device.

At block 845, the digital projector 612 and/or theater management system 638 sends a second message to server computing device 630. The second message may include an indication of a second movie trailer to be played. Before, commensurate with, or after the sending of the second message at block 845, digital projector 612 may begin playing the second movie trailer (block 865).

At block 850, the server computing device 630 may determine a second movie trailer and/or a length of the second movie trailer. At block 855, the server computing device 630 generates a message comprising an identifier of the second movie trailer and/or a length of the second movie trailer. At block 860, the mobile devices each prompt users for user feedback and receive such user feedback (e.g., votes and/or ratings) for the movie trailers. At block 870, the mobile devices then send the user feedback (votes/ratings) for the first movie trailer back to the server computing device.

Figure 9:
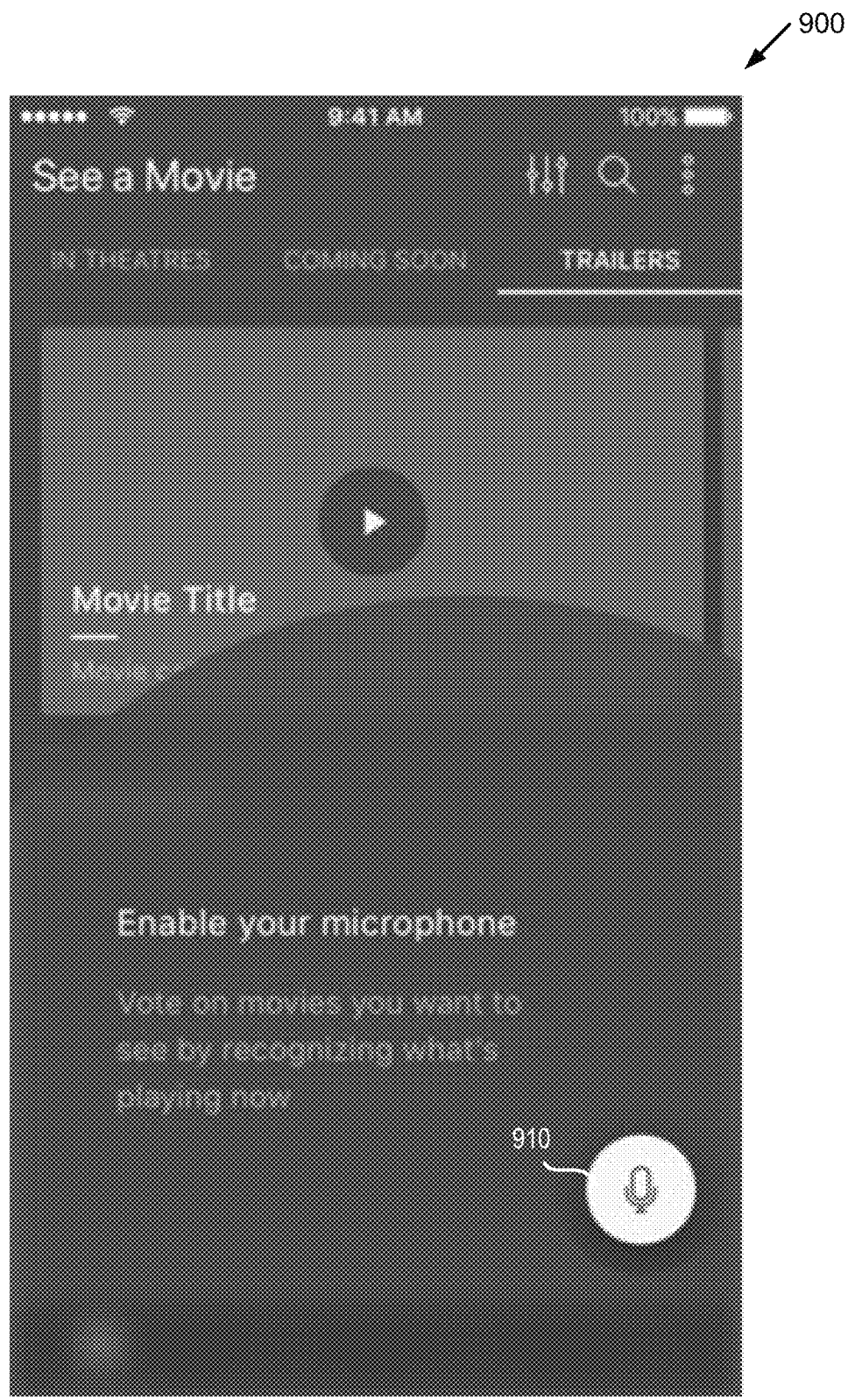
FIG. 9 is a screen shot of a movie application prior to activation of a mobile trailer voting mode, according to an embodiment.

FIG. 9 is a screen shot 900 of a movie application prior to activation of a mobile trailer voting mode, according to an embodiment. As shown, a microphone button 910 is provided to enable a user to activate a mobile device's microphone. A user may press the microphone button 910 to enable the microphone and place the movie application into a movie trailer voting mode. Alternatively, the movie application may be automatically placed into movie trailer voting mode and the microphone may automatically be enabled at a certain time (e.g., when the movie is scheduled to begin and/or when the user launches the movie application).

Figure 10:
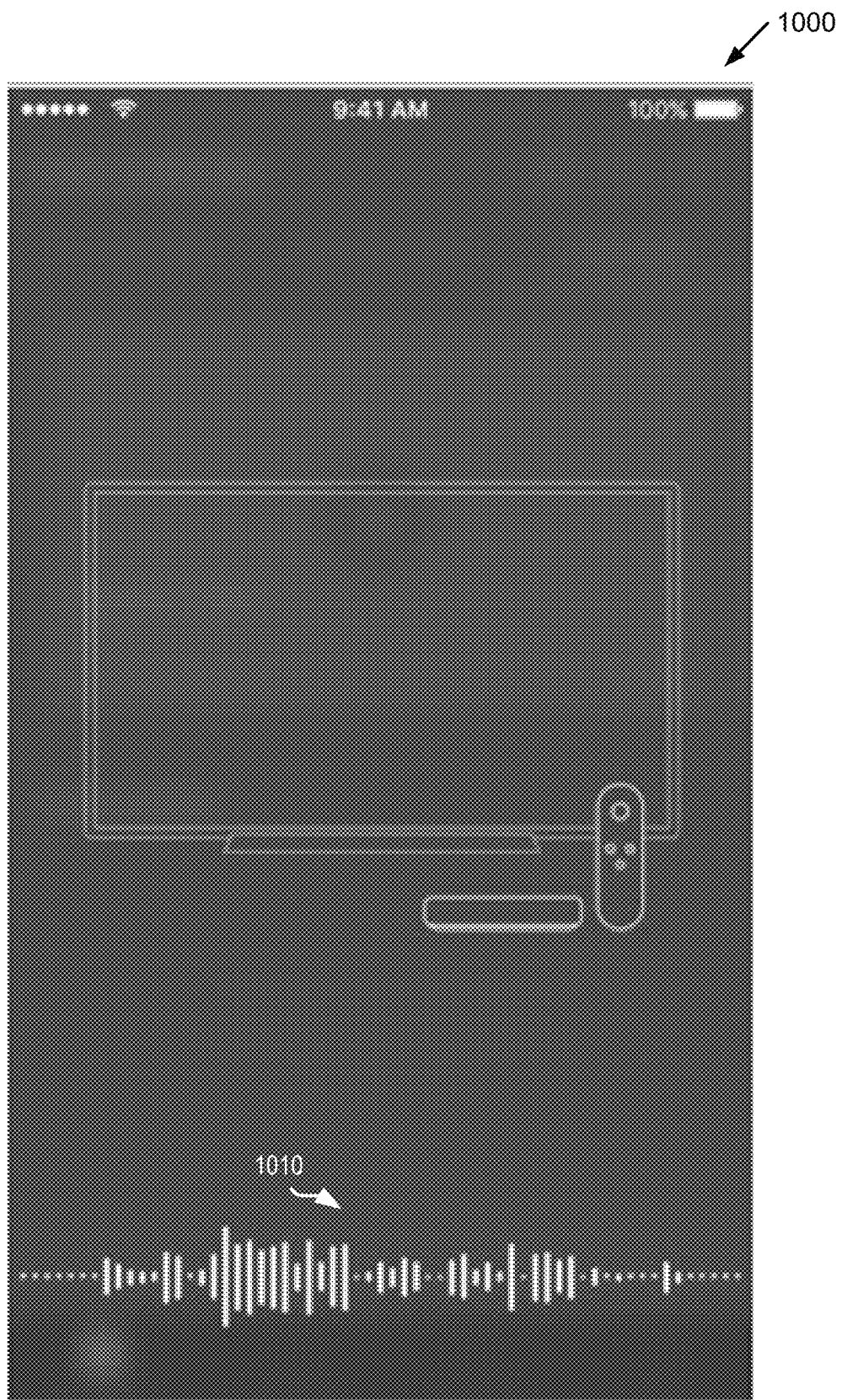
FIG. 10 is a screen shot of a movie application after activation of a mobile trailer voting mode and before a movie trailer is identified, according to an embodiment.

FIG. 10 is a screen shot 1000 of a movie application after activation of a mobile trailer voting mode and before a movie trailer is identified, according to an embodiment. The movie application may enter the movie trailer voting mode shown in screen shot 1000 after a user presses microphone button 910 of screen shot 900. This may cause the movie application to begin capturing audio data and attempting to identify a movie trailer from the audio data. While capturing audio data, the movie application may display an audio visualization 1010 based on the captured audio data.

Figure 11:
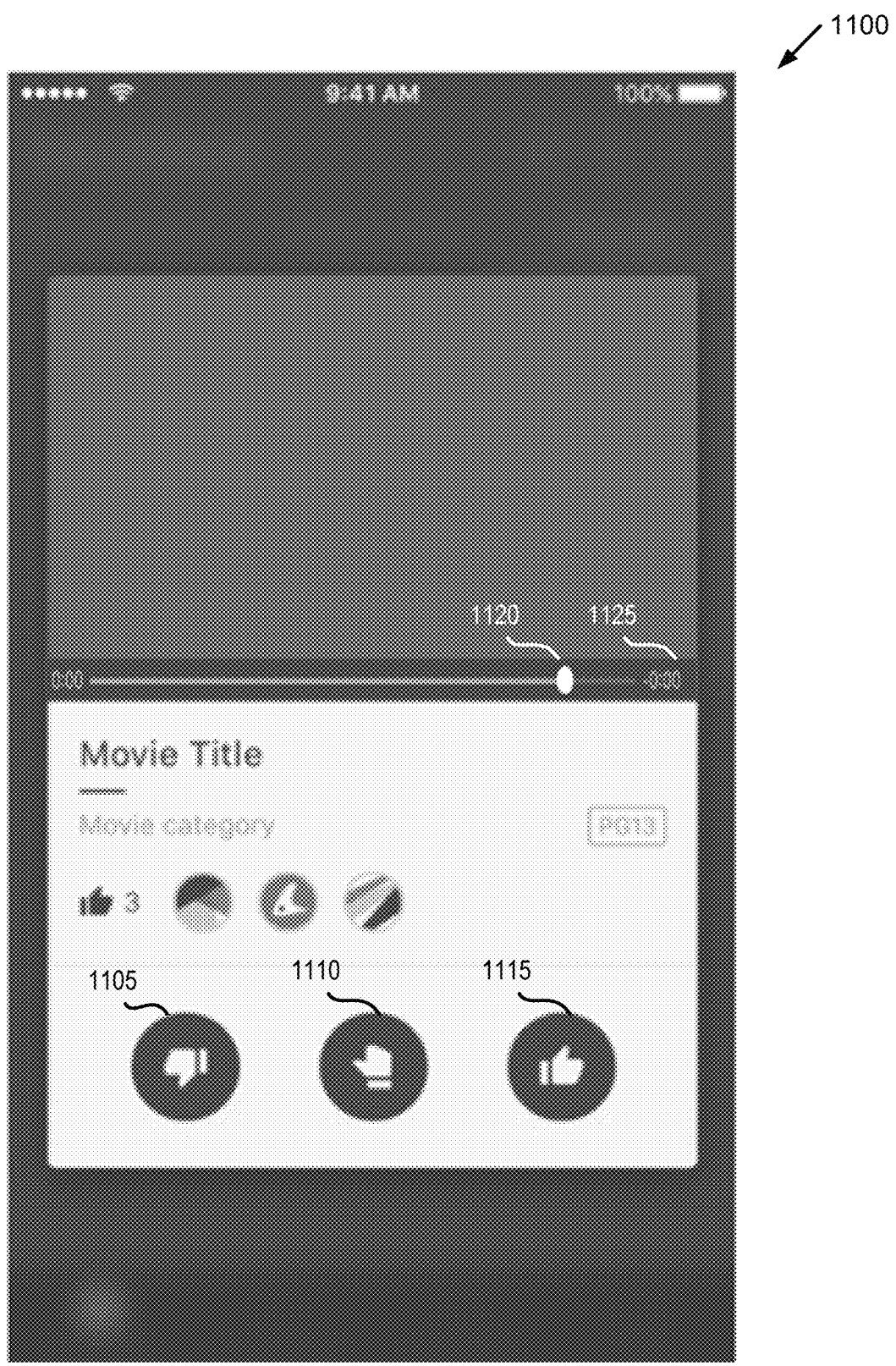
FIG. 11 is a screen shot of a movie application after a movie trailer is identified, according to an embodiment.

FIG. 11 is a screen shot 1100 of a movie application after a movie trailer is identified, according to an embodiment. The movie application may identify a time index in the movie trailer as well as an identity of the movie trailer. The movie application may further determine a length of the movie trailer once the movie trailer is identified. The time index 1120 representing the time offset into the movie trailer that is presently being played is shown as well as the movie trailer length 1125 or ending time.

The screen shot 1100 further shows a title of the movie associated with the movie trailer, and a number of positive and/or negative votes of the movie trailer by others (e.g., others that have a relationship with a user of the mobile device running the movie application). Additionally, the screen shot 1100 shows buttons or options for a thumbs up or positive vote 1115 for the movie trailer, a maybe vote 1110 for the movie trailer and a thumbs down or negative vote 1105 for the movie trailer. In one embodiment, a user can vote that they are interested in seeing the movie by pressing on a button for the thumbs up vote 1115 or by swiping to the right. In one embodiment, a user can vote that they are not interested in seeing the movie by pressing on a button for the thumbs down vote 1105 or by swiping to the left. In one embodiment, a user can vote that they are unsure of whether they want to see the movie by pressing on a button for the maybe vote 1110 or by swiping up or down.

Figure 12:
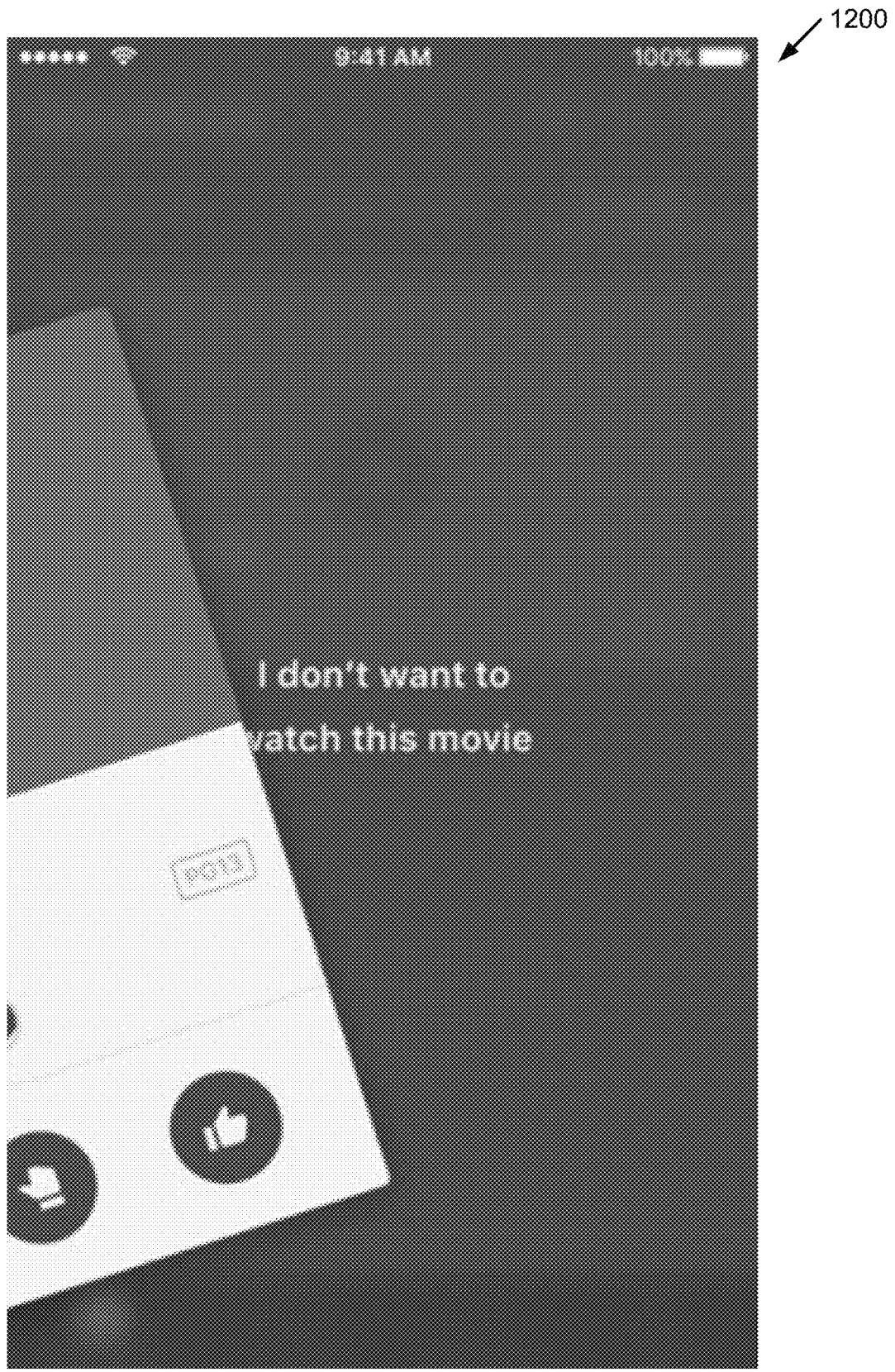
FIG. 12 is a screen shot of a movie application after a user has indicated that they do not want to watch a movie associated with a movie trailer, according to an embodiment.

FIG. 12 is a screen shot 1200 of a movie application after a user has indicated that they do not want to watch a movie associated with a movie trailer, according to an embodiment. For example, a user may have swiped left after being provided a display shown in screen shot 1100.

Figure 13:
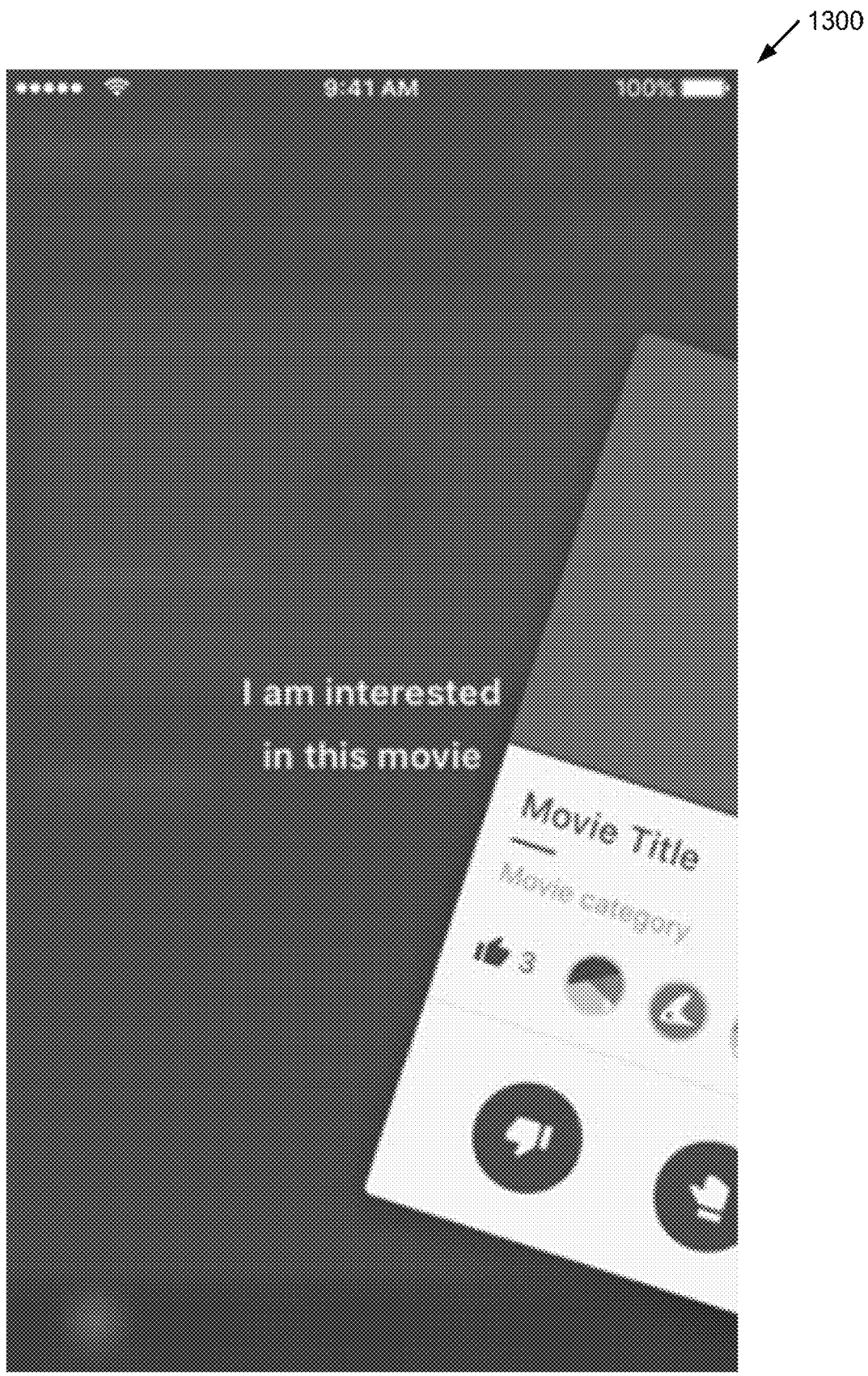
FIG. 13 is a screen shot of a movie application after a user has indicated that they do want to watch a movie associated with a movie trailer, according to an embodiment.

FIG. 13 is a screen shot 1300 of a movie application after a user has indicated that they do want to watch a movie associated with a movie trailer, according to an embodiment. For example, a user may have swiped right after being provided a display shown in screen shot 1100.

Figure 14:
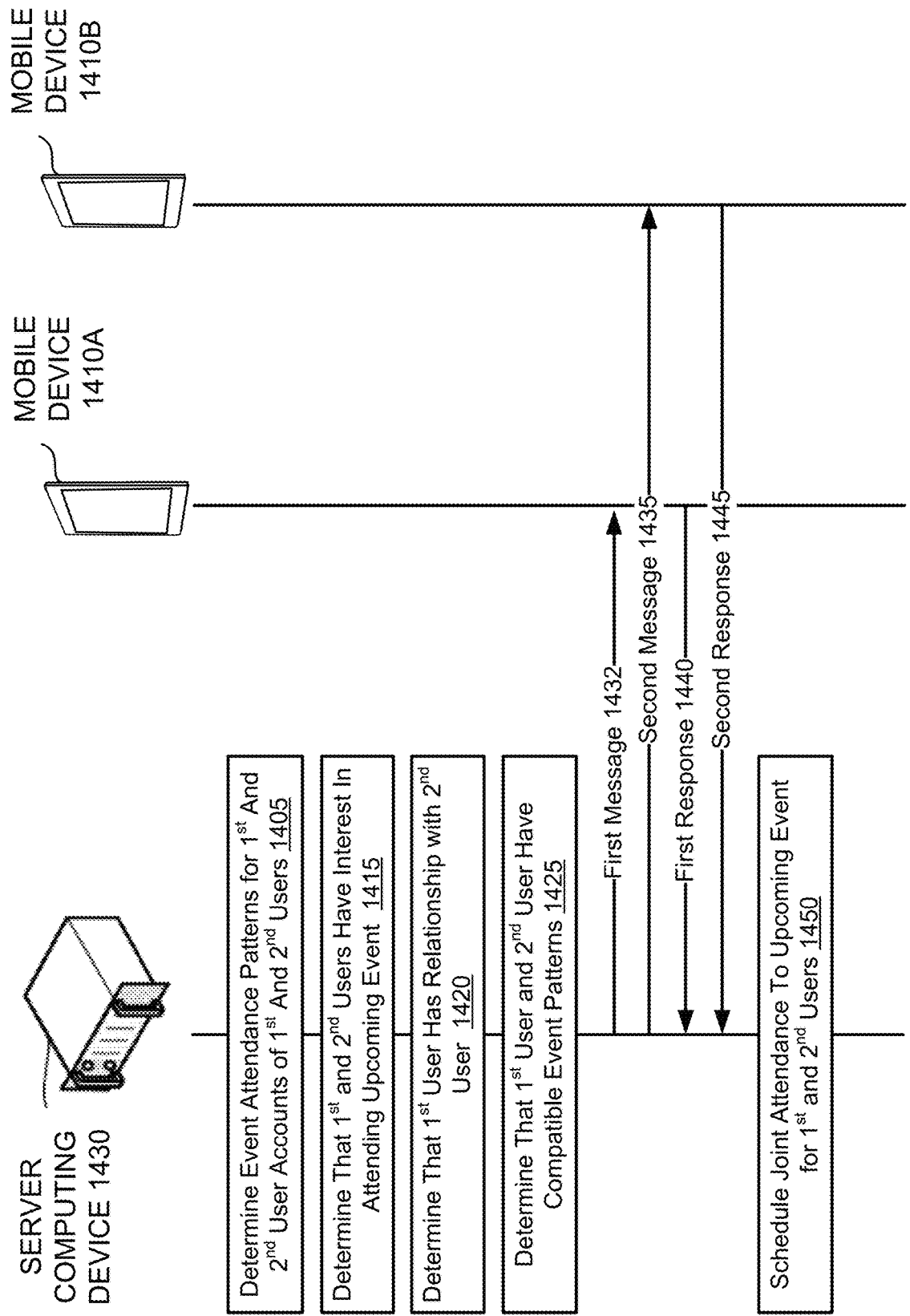
FIG. 14 is a sequence diagram illustrating an event scheduling process, according to an embodiment.

FIG. 14 is a sequence diagram illustrating an event scheduling process, according to an embodiment. The sequence diagram includes a server computing device 1430, a mobile computing device 1410A and a mobile computing device 1410B, each of which may perform one or more operations for the scheduling process. Server computing device 1430 may correspond to server computing device 130 of FIG. 1 or server computing device 630 of FIG. 6 in embodiments. Mobile devices 1410A, 1410B may correspond to mobile devices 110 of FIG. 1 or mobile devices 610 of FIG. 6 in embodiments.

The scheduling process may begin with server computing device 1430 determining event attendance patterns for first and second user accounts of first and second users, respectively (block 1405). The event attendance patterns may be based on one or more of prior event attendance, expressed interest in attending future and/or past events, inferred interest in attending future and/or past events (e.g., based on user clicks on banners, web pages, menu options, etc. associated with events), user feedback associated with movie trailers (e.g., as provided by movie application server 132 or movie application server 632) and/or other information. Some of the data may be received as notices from applications executing on mobile devices of users (e.g., messages indicating user votes or ratings of movie trailers).

The event attendance patterns may be data from a single data point or statistical patterns based on a combination of multiple data points. Each data point may include one or more items of information including the type of event (e.g., movie, sporting event, comedy show, etc.), a subcategory within the type of event (e.g., movie genre, key actors, sporting event type, sporting event team, performer, etc.), a time of the event, a date of the event, an event location, an event cost, a number of tickets purchased for the event, and so on. Location may include state, county, city and/or more particular location such as venue or address.

Different types of data points may be assigned different weights in determining an event attendance pattern. For example, data points representing inferred interest (e.g., click through events) may be given lower weight than data points representing expressed interest (e.g., user feedback on a movie trailer indicating that a user wants to see the movie associated with the movie trailer). In some instances, server computing device 1430 may prompt a user to vote on whether they are interested in attending an event. A user may be prompted, for example, after that user has performed some actions that result in an inferred interest in an event. The user may be prompted based on the inferred interest in the event to determine if the inferred interest translates to an express interest in attending the event. The event attendance pattern for a user account may include preferred days of the week, preferred times of day, preferred venues, and so on. For example, a user may usually watch movies at 7-9 PM on Friday nights at theaters in a particular city or in a particular district of a city. Even attendance patterns may additionally identify a frequency that a user addends events (e.g., events generally or specific types of events), a number of people the user typically attends events with, and so on. Distinct event attendance patterns may be determined for different types of events.

At block 1415, the server computing device determines that the first user and the second user both have an interest in attending the same event. The interest in seeing the event may be based on inferred interest in the event (e.g., click throughs of a user browsing tickets online), expressed interest (e.g., user feedback for a movie trailer indicating that the user wants to see the associated movie), event attendance patterns and/or other data sources mentioned herein.

In one embodiment, event interest graphs are generated for user accounts. Event interest graphs may include data from the event attendance patterns of a user. Event interest graphs may indicate, for example, types of events a user is interested in, genres within a type of event that a user is interested in (e.g., movie genres), specific actors a user likes, specific directors a user likes, specific producers a user likes, and so on. Interest graphs may also indicate negative information on events, genres, actors, directors, producers, etc. that a user does not like.

At block 1420, the server computing device 1430 determines that the first user and second user have some relationship with one another. This determination may be made from a third party dataset (e.g., from a social networking graph of a social network service), from contact information of the first user account and/or second user account (e.g., from contact lists stored on mobile devices of the first and second users), and/or from other sources.

At block 1425, the server computing device 1430 determines that the first user and the second user have compatible event patterns. A compatible event pattern may be determined if the first user and the second user each attend events at or near the same locations. A compatible event pattern may also take into account overlapping times that the first and second user attend events, overlapping days of the week that the first and second user attend events, overlapping amounts of money that the first and second user spend to attend events, and/or other information. For example, if the first user and second user each regularly attend football games at the same football stadium on the same days of the week and same times, and they each purchase tickets for similarly priced seats, then they may have compatible event patterns. However, if the first user and second user each regularly attend football games at the same football stadium on the same days of the week and same times, but they purchase tickets for wildly differently priced seats, then they may not have compatible event patterns.

In one embodiment, an event pattern compatibility score is determined for the event attendance patterns of the first and second user. The event pattern compatibility score may take into account some or all of the aforementioned parameters. The parameters may be evenly weighted or may be assigned different weights. For example, location may have a higher weight than day of the week. If the event pattern compatibility score exceeds a threshold, then server computing device 1430 may determine that the first and second user have compatible event patterns. The event pattern compatibility may be determined for a particular type of event associated with the upcoming event that the first and second user both have an interest in attending.

At block 1432, server computing device 1430 sends a first message to mobile device 1410A of the first user. The first message includes an inquiry asking whether the first user is interested in attending the event with the second user. The first message may or may not include information such as location, time, day, price, and so on. At block 1435, server computing device 1430 sends a second message to mobile device 1410B of the second user. The second message includes an inquiry asking whether the second user is interested in attending the event with the first user. The second message may or may not include information such as location, time, day, price, and so on.

At block 1440, mobile device 1410A sends a first response to the server computing device 1430. The first response indicates whether the first user is interested in attending the upcoming event with the second user. At block 1445, mobile device 1410B sends a second response to the server computing device 1430. The second response indicates whether the second user is interested in attending the upcoming event with the first user. If either the first user or second user are not interested in attending the event with the other user, then no joint attendance of the event is scheduled. However, if the first response and second response each indicate an interest in attending the event with the other user, then at block 1450 the server computing device 1430 schedules joint attendance to the upcoming event for the first and second users.

Figure 15:
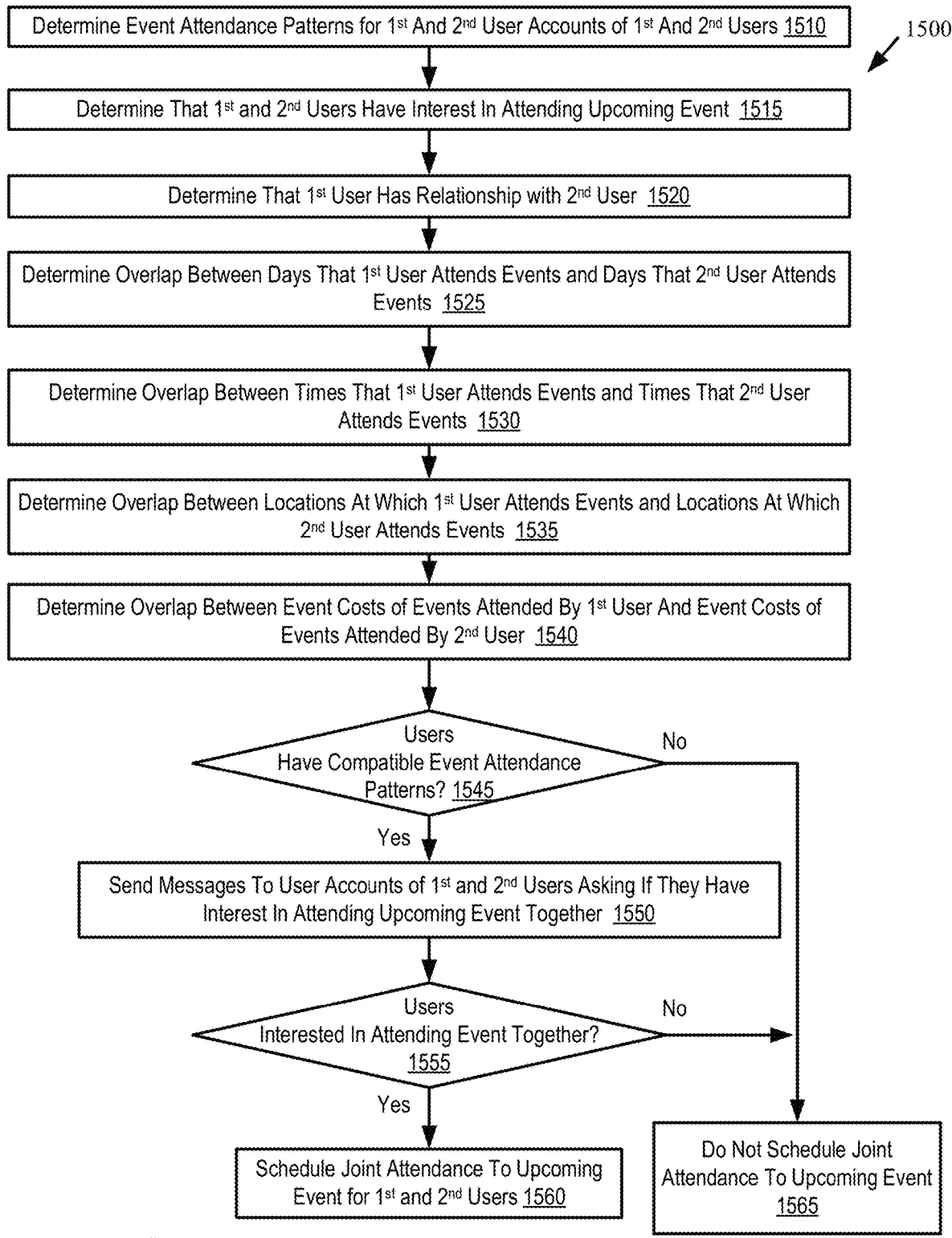
FIG. 15 is a flow diagram illustrating a method of identifying users to attend an event together, according to an embodiment.

FIG. 15 is a flow diagram illustrating a method 1500 of identifying users to attend an event together, according to an embodiment. Method 1500 may be performed by processing logic that comprises hardware (e.g., circuitry, dedicated logic, programmable logic, microcode, etc.), software (e.g., instructions run on a processor), firmware, or a combination thereof. The method 1500 may be performed, for example by server computing device 130 of FIG. 1 or server computing device 630 of FIG. 6 in embodiments.

At block 1510 of method 1500, processing logic determines event attendance patterns for first and second user accounts associated with first and second users, respectively. At block 1515, processing logic determines that the first and second users have an interest in attending the same event. At block 1520, processing logic determines that the first user has a relationship with the second user.

At block 1525, processing logic determines that there is an overlap between days that the first user attends events and days that the second user attends events. The overlap may be determined for events of a particular type or generally for all events. At block 1530, processing logic determines that there is an overlap between times that the first user attends events and times that the second user attends events. The overlap may be determined for events of a particular type or generally for all events. At block 1535, processing logic determines that there is an overlap between locations at which the first user attends events and locations at which the second user attends events. The overlap may be determined for events of a particular type or generally for all events. At block 1540, processing logic determines that there is an overlap between event costs for events that the first user attends and events costs for events that the second user attends. The overlap may be determined for events of a particular type or generally for all events.

Other types of event attendance pattern overlap may also be determined between two or more users than those described above. One additional type of event attendance pattern overlap or compatibility includes type of theater. For example, movies may be played in three dimensional (3D) IMax® screens or in two dimensional (2D) standard digital screens. Some users may prefer to watch 3D movies, while other users may prefer to watch 2D movies. Accordingly, processing logic may determine whether there is overlap in movie screen preference. Additionally, some users may prefer to attend events such as movie showings on opening day, while other users may prefer to attend events after they have been available for a while. Accordingly, processing logic may determine overlap of this event attendance preference.

At block 1545, processing logic determines whether the first user and the second user have compatible event attendance patterns. The users may be determined to have compatible event attendance patterns if there is some overlap for some or all of the days (e.g., at least one overlapping day of the week), times (e.g., at least one overlapping time), locations (e.g., at least one overlapping location) and costs (e.g., at least one overlapping cost) for the first and second user. If the users do not have compatible event attendance patterns, the method proceeds to block 1565. If the users do have compatible event attendance patterns, the method continues to block 1550.

At block 1550, processing logic sends messages to the first and second users asking if they have interest in attending the upcoming event together. The messages may be sent via text messaging (e.g., SMS, MMS, a third party chat service, a etc.), email, voice message, or other message type. The messages may be sent to email addresses of the users, to social network accounts of the users, to phone numbers of the users, or to other physical or virtual addresses associated with the users. At block 1555, processing logic receives responses from the users and determines from the responses whether the users are interested in attending the upcoming event together. The response messages may be received using the same or different messaging protocol as was used to send the messages to the users. If the users are both interested in attending the event together, the method proceeds to block 1560 and joint attendance of the first and second users to the upcoming event is scheduled. If one or both of the users is not interested attending the upcoming event together, the method proceeds to block 1565 and processing logic does not schedule joint attendance to the upcoming event for the first and second users.

Figure 16:
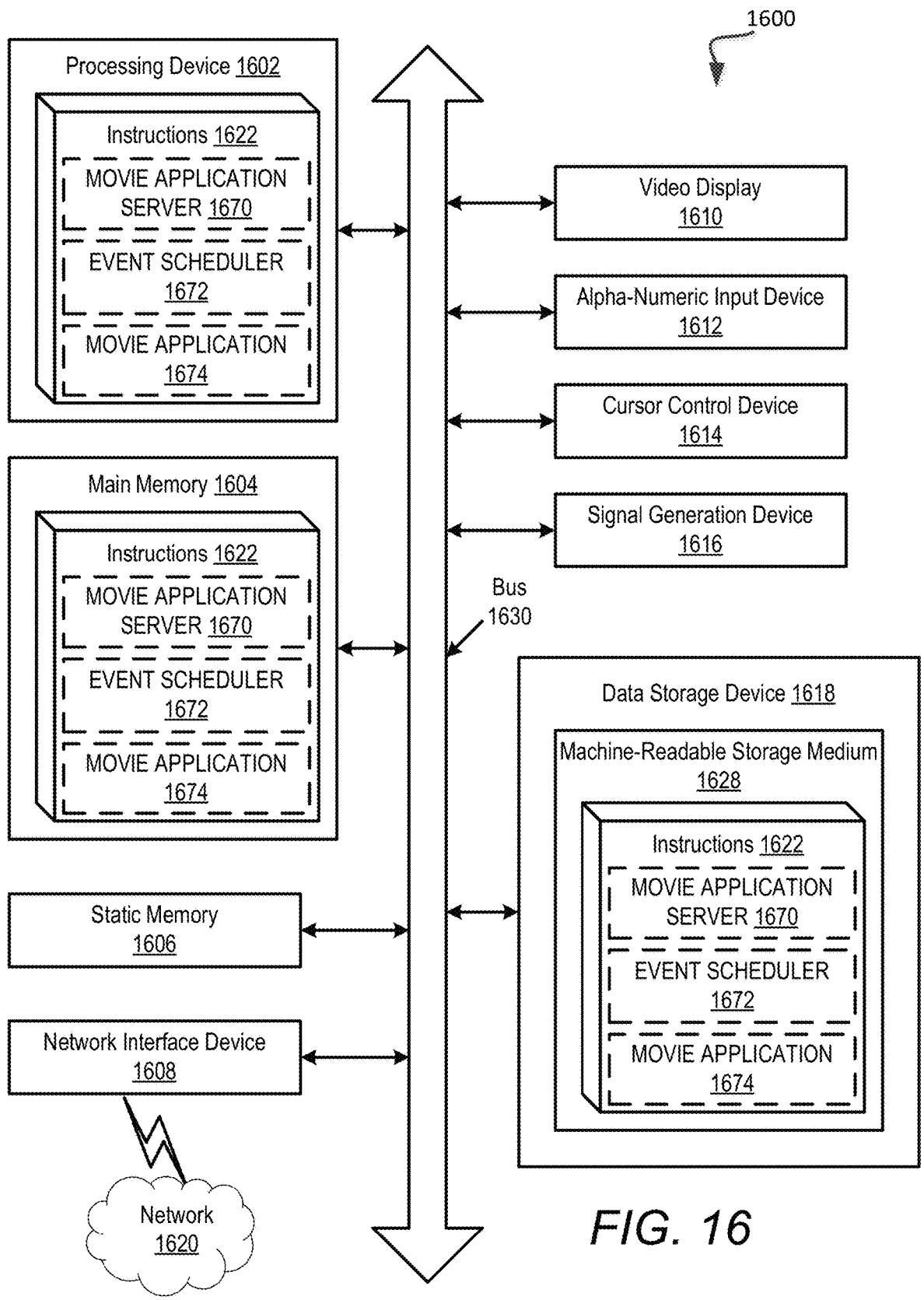
FIG. 16 is a block diagram illustrating an example computer system, according to an embodiment.

FIG. 16 illustrates a diagrammatic representation of a machine in the exemplary form of a computing device 1600 within which a set of instructions, for causing the machine to perform any one or more of the methodologies discussed herein, may be executed. The computing device 1600 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, a mobile phone, a tablet computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 1600 may represent server computing device 130 as shown in FIG. 1 or server computing device 630 as shown in FIG. 6. In one embodiment, computing device 1600 may represent a mobile device 110 as shown in FIG. 1 or a mobile device 610 as shown in FIG. 6.

The computing device 1600 includes a processing device (processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)), and a data storage device 1618, which communicate with each other via a bus 1630.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also be one or more special-purpose processing devices such as an application specific integrated circuit (ASIC), a field programmable gate array (FPGA), a digital signal processor (DSP), network processor, or the like. The processing device 1602 is configured to execute a movie application server 1670, an event scheduler 1672 and/or a movie application 1674 for performing the operations and steps discussed herein. Movie application server 1670 may correspond to movie application server 132 of FIG. 1 and/or movie application server 632 of FIG. 6. Event scheduler 1672 may correspond to event scheduler 140 of FIG. 1 and/or event scheduler 640 of FIG. 6. Movie application 1674 may correspond to movie application 170 of FIG. 1 and/or a movie application described with reference to FIG. 6.

The computing device 1600 may further include a network interface device 1608. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a computer-readable medium 1628 on which is stored one or more sets of instructions 1622 (e.g., instructions of identification service 200) embodying any one or more of the methodologies or functions described herein. The instructions 1622 may also reside, completely or at least partially, within the main memory 1604 and/or within processing logic 1626 of the processing device 1602 during execution thereof by the computer system 1600, the main memory 1604 and the processing device 1602 also constituting computer-readable media.

While the computer-readable storage medium 1628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "receiving", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving audio data of a movie trailer by a mobile device comprising a display and a microphone, wherein the audio data is received via the microphone;
identifying, by the mobile device, the movie trailer from the audio data based on generation of a first digital fingerprint from the audio data and comparison of the first digital fingerprint to digital fingerprints of a first plurality of known video clips, wherein the first plurality of known video clips comprises a first plurality of known movie trailers;
generating a prompt for user feedback regarding a movie associated with the movie trailer;
receiving user feedback regarding the movie associated with the movie trailer;
sending the user feedback to a second computing device, wherein the user feedback is used along with additional user feedback on the movie trailer to gauge demand for the movie;
receiving additional audio data via the microphone after the movie trailer ends;
identifying a video clip indicating that a feature presentation is to begin from the additional audio data based on generation of a second digital fingerprint from the additional audio data and comparison of the second digital fingerprint to the digital fingerprints of the first plurality of known video clips;
determining that the feature presentation is a next presentation and that no more video clips will be shown prior to the feature presentation responsive to identifying the video clip indicating that the feature presentation is to begin; and
deactivating at least one of the display or the microphone responsive to determining that the feature presentation is the next presentation and that no more video clips will be shown prior to the feature presentation.

2. The method of claim 1, further comprising:
determining a likelihood that the user will attend a showing of the movie at a theater based on the user feedback.

3. The method of claim 1, further comprising:
generating the first digital fingerprint of the audio data;
comparing the first digital fingerprint to the digital fingerprints of the first plurality of known video clips;
determining similarity values between the first digital fingerprint and the digital fingerprints of the first plurality of known video clips;
determining that a similarity value between the first digital fingerprint and a particular digital fingerprint of the digital fingerprints satisfies a match criterion; and
identifying a match between the first digital fingerprint and the particular digital fingerprint.

4. The method of claim 1, further comprising:
generating the first digital fingerprint of the audio data;
comparing the first digital fingerprint to the digital fingerprints of the first plurality of known video clips, wherein the digital fingerprints of the first plurality of known video clips are stored on the mobile device, and wherein the digital fingerprints of the first plurality of known video clips comprises a subset of digital fingerprints of a larger second plurality of known video clips stored in a remote data store;
determining similarity values between the first digital fingerprint and the digital fingerprints of the first plurality of known video clips;
determining that the similarity values fail to satisfy a match criterion;
sending the first digital fingerprint to a remote server computing device comprising the remote data store, wherein the second plurality of known video clips comprises a second plurality of known movie trailers that includes additional known movie trailers not included in the first plurality of known movie trailers; and
receiving an identification of the movie trailer from the second computing device.

5. The method of claim 1, further comprising:
determining a time offset into the movie trailer associated with the audio data; determining a length of the movie trailer;
computing a time at which the movie trailer will end based on subtracting the time offset from the length of the movie trailer; and
performing at least one of vibrating or increasing a brightness of the display at the time or at a second time that is within a threshold distance from the time.

6. The method of claim 5, further comprising:
outputting the prompt at the time or at the second time.

7. The method of claim 5, wherein the mobile device is paired with a wearable device that comprises a second display, the method further comprising:
causing the wearable device to perform at least one of vibrate or increase a brightness of the second display at the second time.

8. The method of claim 7, further comprising:
causing the wearable device to output a second prompt for user feedback; and
receiving the user feedback from the wearable device in response to a user interacting with the wearable device.

9. The method of claim 1, further comprising:
determining that a likelihood that the user will attend a showing of the movie is greater than a threshold;
determining that the movie is playing in theaters; and
generating a reminder for the user to attend the movie.

10. The method of claim 1, further comprising:
sending a text message to a phone number;
receiving a response message comprising a link to a website;
accessing the website by a web browser of the mobile device using the link;
receiving an instruction from the website to activate the microphone of the mobile device; and
activating the microphone.

11. A method comprising:
receiving audio data of a movie trailer by a computing device;
generating a first digital fingerprint of the audio data;
comparing the first digital fingerprint to digital fingerprints of a plurality of known movie trailers;
determining similarity values between the first digital fingerprint and the digital fingerprints of the plurality of known movie trailers;
determining that a first similarity value between the first digital fingerprint and a second digital fingerprint associated with a first known movie trailer of a particular movie satisfies a match criterion;
determining that a second similarity value between the first digital fingerprint and a third digital fingerprint associated with a second known movie trailer of the particular movie satisfies the match criterion;
receiving additional audio data;
generating a fourth digital fingerprint of the additional audio data;
comparing the fourth digital fingerprint to one or more additional digital fingerprints of the first known movie trailer and to one or more additional fingerprints of the second known movie trailer;
determining that the fourth digital fingerprint matches a fifth digital fingerprint of the first known movie trailer but not a sixth digital fingerprint of the second known movie trailer;
determining that the movie trailer is an instance of the first known movie trailer;
generating a prompt for user feedback regarding the particular movie associated with the first known movie trailer;
receiving user feedback regarding the particular movie associated with the first known movie trailer; and
sending the user feedback to a second computing device, wherein the user feedback associated with the first known movie trailer is used along with additional user feedback associated with the second known movie trailer to determine which movie trailer generates greater user interest.

12. A mobile device comprising:
a microphone;
a display; and
a processing device operatively coupled to the microphone and to the display, wherein the processing device is to:
activate the microphone;
receive audio data of a movie trailer via the microphone;
identify the movie trailer from the audio data based on generation of a first digital fingerprint from the audio data and comparison of the first digital fingerprint to digital fingerprints of a first plurality of known video clips, wherein the first plurality of known video clips comprises a first plurality of known movie trailers;
generate a prompt for user feedback regarding a movie associated with the movie trailer;
output the prompt to the display;
receive user feedback regarding the movie associated with the movie trailer;
send the user feedback to a remote computing device, wherein the user feedback is used along with additional user feedback on the movie trailer to gauge demand for the movie;
receive additional audio data via the microphone after the movie trailer ends;
identify a video clip indicating that a feature presentation is to begin from the additional audio data based on generation of a second digital fingerprint from the additional audio data and comparison of the second digital fingerprint to the digital fingerprints of the first plurality of known video clips;
determine that no more movie trailers will be shown prior to the feature presentation responsive to identifying the video clip indicating that the feature presentation is to begin; and
deactivate at least one of the display or the microphone responsive to determining that no more movie trailers will be shown prior to the feature presentation.

13. The mobile device of claim 12, wherein the processing device is further to:
generate the first digital fingerprint of the audio data;
compare the first digital fingerprint to the digital fingerprints of the first plurality of known video clips;
determine similarity values between the first digital fingerprint and the digital fingerprints of the first plurality of known video clips;
determine that a similarity value between the first digital fingerprint and a particular digital fingerprint of the digital fingerprints satisfies a match criterion; and
identify a match between the first digital fingerprint and the particular digital fingerprint.

14. The mobile device of claim 12, wherein the processing device is further to:
- generate the first digital fingerprint of the audio data;
- compare the first digital fingerprint to the digital fingerprints of the first plurality of known video clips, wherein the digital fingerprints of the first plurality of known video clips are stored on the mobile device, and wherein the digital fingerprints of the first plurality of known video clips comprises a subset of digital fingerprints of a larger second plurality of known video clips stored in a remote data store;
- determine similarity values between the first digital fingerprint and the digital fingerprints of the first plurality of known video clips;
- determine that the similarity values fail to satisfy a match criterion;
- send the first digital fingerprint to the remote computing device comprising the remote data store, wherein the second plurality of known video clips comprises a second plurality of known movie trailers that includes additional known movie trailers not included in the first plurality of known movie trailers; and
- receive a notice of the movie trailer from the remote computing device.

15. The mobile device of claim 12, wherein the processing device is further to:
- determine a time offset into the movie trailer associated with the audio data; determine a length of the movie trailer;
- compute a time at which the movie trailer will end based on subtracting the time offset from the length of the movie trailer; and
- cause the mobile device to vibrate or increase a brightness of the display at the time or at a second time that is within a threshold time distance from the time.

16. The mobile device of claim 15, wherein the processing device is further to:
- output the prompt at the time or at the second time.

17. The mobile device of claim 12, wherein the processing device is further to:
- send a text message to a phone number;
- receive a response message comprising a link to a website;
- access the website by a web browser of the mobile device using the link;
- receive an instruction from the website to activate a microphone of the mobile device; and
- activate the microphone.

18. A mobile device comprising:
- a microphone;
- a display; and
- a processing device operatively coupled to the microphone and to the display, wherein the processing device is to:
  - activate the microphone;
  - receive audio data of a movie trailer via the microphone;
  - generate a first digital fingerprint of the audio data;
  - compare the first digital fingerprint to digital fingerprints of a plurality of known movie trailers;
  - determine similarity values between the first digital fingerprint and the digital fingerprints of the plurality of known movie trailers;
  - determine that a first similarity value between the first digital fingerprint and a second digital fingerprint associated with a first known movie trailer of a particular movie satisfies a match criterion;
  - determine that a second similarity value between the first digital fingerprint and a third digital fingerprint associated with a second known movie trailer of the particular movie satisfies the match criterion;
  - receive additional audio data;
  - generate a fourth digital fingerprint of the additional audio data;
  - compare the fourth digital fingerprint to one or more additional digital fingerprints of the first known movie trailer and to one or more additional fingerprints of the second known movie trailer;
  - determine that the fourth digital fingerprint matches a fifth digital fingerprint of the first known movie trailer but not a sixth digital fingerprint of the second known movie trailer;
  - generate a prompt for user feedback regarding the particular movie associated with the first known movie trailer;
  - output the prompt to the display;
  - receive user feedback regarding the particular movie associated with the first known movie trailer; and
  - send the user feedback to a remote computing device, wherein the user feedback associated with the first known movie trailer is used along with additional user feedback associated with the second known movie trailer to determine which movie trailer generates greater user interest.

* * * * *